United States Patent [19]

Anzai et al.

[11] Patent Number: 5,453,822
[45] Date of Patent: Sep. 26, 1995

[54] OPTIONAL SIDE MULTI-TONER IMAGE FORMING APPARATUS USING INTERMEDIATE TRANSFER MEMBER

[75] Inventors: Masayasu Anzai; Yasuo Kikuchi, both of Ibaraki, Japan

[73] Assignee: Hitachi Koki Co., Ltd., Tokyo, Japan

[21] Appl. No.: 60,057

[22] Filed: May 13, 1993

[30] Foreign Application Priority Data

May 15, 1992 [JP] Japan .................................. 4-123188
Jul. 24, 1992 [JP] Japan .................................. 4-198196
Nov. 6, 1992 [JP] Japan .................................. 4-296827

[51] Int. Cl.$^6$ ........................ G03G 15/01; G03G 13/00
[52] U.S. Cl. ................................ 355/271; 355/326 R
[58] Field of Search ............................. 355/271–275, 355/319, 326 R, 328, 208, 214, 216; 430/42

[56] References Cited

U.S. PATENT DOCUMENTS

| | | |
|---|---|---|
| 4,078,929 | 3/1978 | Gundlach . |
| 4,095,979 | 6/1978 | DiFrancesco et al. . |
| 4,422,405 | 12/1983 | Kasahara et al. . |
| 4,477,176 | 10/1984 | Russel . |
| 4,562,129 | 12/1985 | Tanaka et al. ............................ 430/42 |
| 4,688,925 | 8/1987 | Randall ............................ 355/319 |
| 4,814,797 | 3/1989 | Haneda et al. ............................ 346/157 |
| 4,990,955 | 2/1991 | May et al. ............................ 355/208 |
| 5,027,159 | 6/1991 | Oda et al. ............................ 355/271 |
| 5,049,949 | 9/1991 | Parker et al. ............................ 355/328 |
| 5,070,371 | 12/1991 | Randall ............................ 355/272 |
| 5,138,389 | 8/1992 | Randall ............................ 355/272 |
| 5,159,392 | 10/1992 | Kasahara et al. ............................ 355/274 |
| 5,204,716 | 4/1993 | Kasahara et al. ............................ 355/24 |

FOREIGN PATENT DOCUMENTS

| | | |
|---|---|---|
| 55-83070 | 6/1980 | Japan . |
| 63-58376 | 3/1988 | Japan ............................ 355/328 |
| 2-302768 | 12/1990 | Japan . |
| 3-18182 | 3/1991 | Japan . |
| 3-221976 | 9/1991 | Japan . |
| 3-228467 | 10/1991 | Japan . |
| 4-5669 | 1/1992 | Japan . |

*Primary Examiner*—Joan H. Pendegrass
*Attorney, Agent, or Firm*—Sughrue, Mion, Zinn, Macpeak & Seas

[57] ABSTRACT

A first-side toner image 25 is formed on a photo receptor 2 and transferred on a dielectric belt 19. A second-side toner image 18 is formed on the photo receptor 2. The two toner images 25 and 18 are simultaneously transferred on both sides of a print paper 26, and fixed thereon by paired heat rolls 30 and 31.

9 Claims, 9 Drawing Sheets

(a)

OPTIONAL SIDE MULTI-TONER IMAGE FORMING APPARATUS USING INTERMEDIATE TRANSFER MEMBER

BACKGROUND OF THE INVENTION

1. Field of the Invention

The present invention relates to a toner image forming apparatus.

2. Discussion of the Related Art

There are many proposals to print images on a print paper which are based on the Xerographic process, electrostatic recording process, magnetic recording process, or the like. Among those proposals, copying machines based on the Xerographic process and laser printers based on the combination of the Xerographic process and the laser scan exposure process have been widely used.

The simplex printing techniques are disclosed in Japanese Patent Unexamined Publication Nos. Hei. 3-228467, 3-221976, Japanese Patent Examined Publication No. Hei 3-18182, and Japanese Patent Unexamined Publication No. Sho. 55-83070. The duplex printing techniques are disclosed in U.S. Pat. Nos. 4,477,176 and 4,095,979. The disclosed duplex printing techniques, which are able to print images on both sides of a print paper, suffers from the following problems. The paper size available for the duplex printing is limited to only some specific sizes of paper. The mechanisms for the duplex printing are complicated in construction and poor in reliability.

Also, some techniques for forming a toner image of multi-color by the Xerographic printing method or an electrostatic printing method are disclosed in, for example, Published Unexamined Japanese Patent Application Nos. Hei. 2-302768 and Hei 4-5669 and U.S. Pat. Nos. 4,422,405 and 4,078,929.

In such conventional color printers, a latent electrostatic image is formed on an insulating recording media, such as a dielectric or photoconductive photo receptor, and is developed with developer containing colored particle toner, thereby forming a color image.

To form a color image of a multiple of colors by using a color printer based on the just-mentioned principle, the color toner images of used colors are formed repeatedly, and are composed into a single color toner image. In the color printer using four primary colors, for example, toner images of black, magenta, cyan, and yellow are formed, and these toner images of four colors are registered and composed into one color toner image of full color.

In the above-mentioned conventional color printer, compared with a monocolor printer, the toner image forming apparatus is complicated and expensive. Therefore, it can be used for only a limited number of fields.

Also, the color toner images must be registered with one another highly accurately.

Further, the conventional color printer takes a longer print time than the monochromatic printer. In the case of the color printer using four primary colors, for example, its print time is approximately four times as long as that of the monochromatic printer.

When a multi-color image is formed by the conventional color printer, color toner images of several colors are registered and composed into a single color image. High registration accuracy is not required for the formation of picture images. However, to form the characters and fine lines, high registration accuracy is required, practically, it must be at least within 0.07 to 0.1 mm. Therefore, characters and fine lines, when formed, sometimes suffer from color displacement.

SUMMARY OF THE INVENTION

The present invention has been made in view of the above circumstances and has an object to provide a toner image forming apparatus which is capable of reliably printing toner images on both sides of a print paper at high speed.

Another object of the present invention is to provide a toner image forming apparatus which is able to form plural types of images of monocolor (one type), two colors(two types), multi-color (plural types) and full color without excessive decrease of print speed.

A further object of the present invention is to provide a high speed color printer which can print a color image at a high speed while not increasing the developing speed, which determines the picture quality of the resultant color image.

A Still further object of the present invention is to provide a high speed color printer which can form a color image of high picture quality, lowering the required registration accuracy in the formation of a color image.

The above object of the invention can be achieved by provision of a toner image forming apparatus, forming a first toner image on the first recording media, transferring the first toner image on the second recording media, forming a second toner image on the first recording media, and transferring the first and second toner images on both sides of a third recording media.

The two types of toner images can be stably formed on the photo receptor as the recording media in a manner that charge voltage and residual voltage on the photo receptor are measured, and charge current and a quantity of exposure light are controlled according the measured voltages.

Provision of rotary means located upstream or downstream of a developing roll prevents toner from scattering from a developing unit.

Collection of used toner, which is made for the purpose of saving toner necessary for forming two types of toner images, can be achieved in a manner that two types of toner, positively or negatively charged toner, are mixed and an AC bias is applied during the developing process.

Selective, successive, and high speed formation of color images as toner images on the third or final recording media can be achieved in a manner that the final recording media is shaped like an endless belt, and the belt is driven from the inner side of the loop of the endless belt.

With provision of the toner image forming apparatus as mentioned above, one passage of the recording substance through the apparatus completes the duplex print.

Also, to achieve the above object, there is provided a toner image forming apparatus having a function to form images of one type or plural types on a first recording media and to transfer and fix the images on a final recording media, a function to repeat, one or plural times, the transfer of the images of the first recording media on a second recording media, thereby composing an image, and to transfer and fix the composed image on the reverse side of a final recording media, and a function to select either of the above functions.

With such a construction, the toner image forming apparatus is able to form images of monocolor (one type) or two colors (two types) on the obverse side or the reverse side of a final recording media independently or simultaneously without excessive decrease of print speed. Accordingly, the images of monocolor (one type), two colors (two types), multi-color (plural types) and full color can be formed by using one toner image forming apparatus.

Further, to achieve the above object of the invention, there is provided a high speed color printer comprising: first means for forming latent electrostatic images; second means for developing the latent electrostatic images with a multiple of color toner; and third means for transferring the developed color image on a print media; wherein the speed of forming the latent electrostatic images by the first means is higher than the speed of developing the latent electrostatic images by the second means, the second means carries out the development process of a multiple of colors concurrently with the formation of the latent electrostatic images, and the transfer speed of a part of the third means is equal to the latent image forming speed.

Still further, to achieve the above object, there is provided another high speed color printer comprising: first means for separating a color input signal into a character signal and a picture signal; second means for converting a color of the character signal output from the first means into a specific color signal; and third means for composing the specific color signal output from the second means and the picture signal output from the first means into a color signal; wherein the color of the specific color signal is used for the characters, and multi-color toner images are registered with one another using the composite color signal, and composed into a single color signal on a print media.

With the arrangement of the first high speed color printer, latent electrostatic images for multi-color are formed at a higher speed than the developing speed, and the development of the multi-color latent electrostatic images is carried out concurrently the formation of the latent electrostatic images. The transfer speed of a part of the third means is equal to the latent image forming speed. Accordingly, the latent electrostatic image forming process, the developing process, and the image transfer process are carried out at high speed without any damage of the picture quality. As a result, a high speed printing operation is realized.

With the arrangement of the second high speed color printer, the characters and fine lines, which must be registered at high accuracy, are separated from the picture image not requiring high registration accuracy. The color of the characters and fine lines requiring high registration accuracy is selected depending on color of the characters and fine lines. The color image is printed in the selected color.

BRIEF DESCRIPTION OF THE DRAWINGS

FIGS. 8(a) to 8(c) are graphs showing curves representing potential distributions of latent electrostatic images formed on the photo receptor, for explaining states of the latent images in FIG. 7, wherein FIG. 8(a) shows the potential distribution of the latent image when toner images of two colors are formed, FIG. 8(b) shows the potential variation when the latent image is developed with monocolor toner of which the charge polarity is opposite to that of the photo receptor, and FIG. 8(c) shows the potential distribution when the latent image is developed with monocolor toner having the same charge polarity as that of the photo receptor;

FIGS. 10(a) to 10(c) are graphs showing the relationships between latent electrostatic images formed on the photo receptor, and bias voltages (DC components) applied to the developing units at the time of development when the toner image forming apparatus constructed as shown in FIG. 9 is operated for printing purposes, wherein FIG. 10(a) shows a potential distribution when toner images of two colors are formed using one latent electrostatic image, FIG. 10(b) shows a potential distribution of a latent electrostatic image when it is developed with monocolor toner by a Y-color developing unit, and FIG. 10(c) shows a potential distribution of a latent electrostatic image when it is developed with monocolor toner by an M-color developing unit;

FIGS. 11(a) to 11(d) are view showing other chargers used in the toner image forming apparatus according to the present invention, respectively, wherein FIG. 11(a) shows a charger which is comprised of a shield electrode, a corona wire, and a screen grid, and in which a DC power source is connected between the shied electrode and the corona wire; FIG. 11(b) shows another charger which is comprised of the same components as those of the charger shown in FIG. 11(b), and in which a DC power source is connected to the screen grid, and an AC power source is connected between the shied electrode and the corona wire; FIG. 11(c) shows yet another charger in which an auxiliary electrode is provided at the open end of the shield electrode, and an AC power source is connected to the auxiliary electrode as in the case of FIG. 11(a), and FIG. 11(d) shows still another charger in which two corona wires are provided within the shield electrode, one connecting to an AC power source and the other connecting to a DC power source;

DETAILED DESCRIPTION OF THE PREFERRED EMBODIMENTS

The present invention will be described in detail using some specific embodiments with reference to the accompanying drawings.

In the present invention, any of the process, electrostatic printing process, Xerographic process, and magnetic printing process may be used for forming toner images on a first recording media. Further, the mechanical pressing method or toner spraying method may also be used. Accordingly, the present invention may be applied for either single color prints or multi-color prints, which are based on the selected process or method. In the description of the specification to follow, the present invention is incorporated into a laser printing machine, which is based on the combination the Xerographic process and the laser scan exposure process.

(Embodiment 1)

Figure 1:
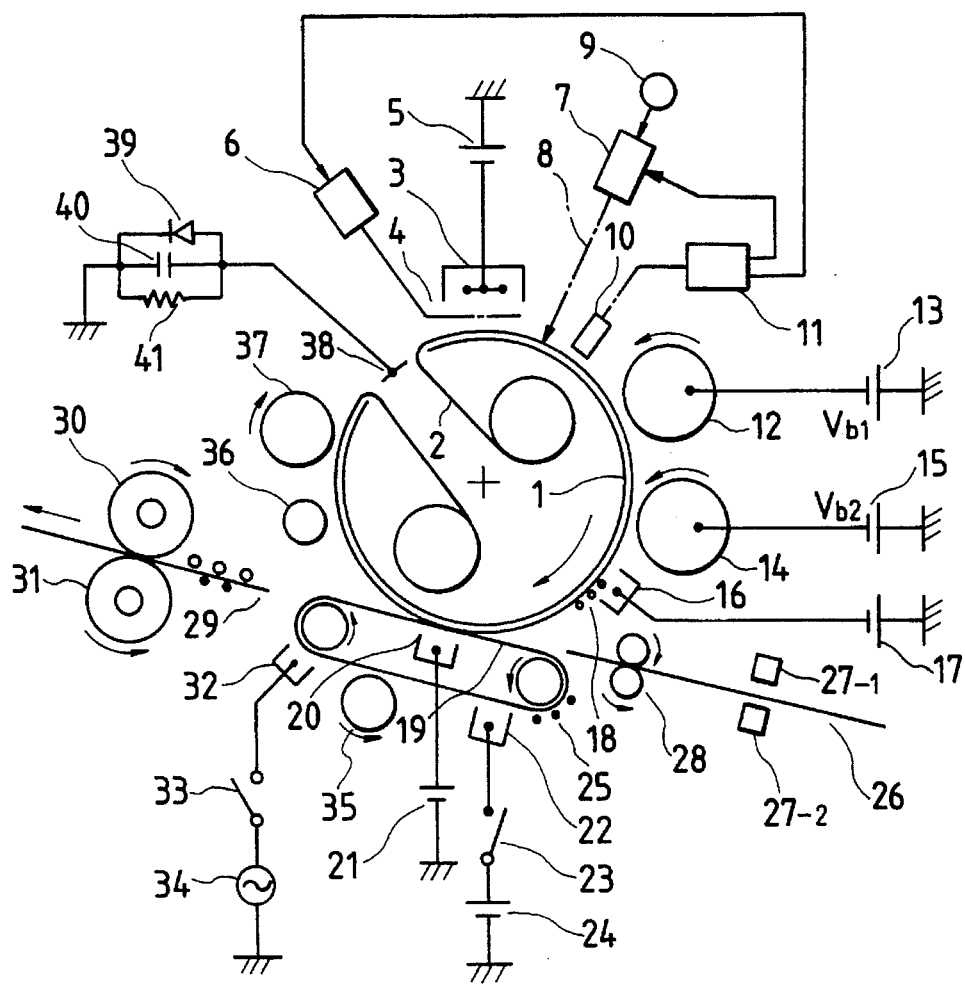
FIG. 1 is an explanatory diagram showing a toner image forming apparatus in the form of a duplex printing machine according to an embodiment of the present invention.

FIG. 1 schematically illustrates the construction of a laser printing machine according to a first embodiment of the present invention. The laser printing machine is able to simultaneously print two different toner images, e.g., two color images, on both sides of hard copy paper by using a photo receptor for a first recording media. As shown, the first recording media consists of a drum base 1 and a photo receptor 2, shaped like a belt, which is wound around the drum base 1. After a predetermined amount of the photo receptor 2 is used, the photo receptor is pulled out of the drum base 1. After used, it is put into the drum base 1 and rolled therein. With rotation of the drum, a corona charger 3 uniformly charges the surface of the photo receptor 2 on the drum base 1. The charger 3 includes a grid 4 for controlling the charge voltage, and a corona wire. The grid 4 is connected to a grid power source 6, and the corona wire is connected to a high voltage source 5. In this embodiment, the photo receptor 2 is negatively charged. Subsequently, the surface of the photo receptor 2 is illuminated with a laser beam 8 emitted from a laser source 7, so that a latent electrostatic image corresponding to information to be recorded is formed on the photo receptor. At this time, the laser source 7 is driven by a signal from a print information source 9. Also in this embodiment, in order to form two different toner images (e.g., images of two colors), two different latent images are formed through the illumination of the laser beam (as will be described in detail with reference to FIG. 2). In this case, two different latent images must be formed exactly within predetermined image areas on the photo receptor or Xerographic surface. This is achieved by properly controlling the surface potential of the photo receptor 2 charged by the charger 3 and the quantity of laser beam 8. To this end, a potential sensor 10 senses at least two of the following three surface potentials; the surface potential Vo on the portion of the photo receptor where is not exposed to the laser beam, the surface potential $V_{1R}$ on the portion of the photo receptor 2 where is exposed to a first information source, and the surface potential (residual potential) $V_{2R}$ on the portion of the photo receptor where is exposed to a second information source. A controller 11 controls the grid power source 6 and the laser source 7 so that (Vo–$V_{1R}$) and ($V_{1R}$–$V_{2R}$) are within predetermined ranges. Those surface potentials are preferably selected in the following way. (Vo–$V_{1R}$) is approximately equal to ($V_{1R}$–$V_{2R}$), and the other surface potentials other than the surface potential Vo are preferably about ½ as large as Vo, e.g., 300 to 500 V. Those selected values vary depending on the developing characteristics to be given later. In a case where the photo receptor is made of organic material, the surface potential $V_{2R}$ is selected to be within the range of 50 to 150 V, although it varies with ambient temperature and time. A measure is taken for the surface potential variation by the ambient conditions. In the measure, the surface potentials are detected and the values (Vo–$V_{1R}$) and ($V_{1R}$–$V_{2R}$) are controlled according to the detected potential, as described above. In this way, the two different images can be stably obtained.

Next, the two latent images thus formed are developed using two types of toner, e.g., black toner and chromatic color toner or magnetic toner and nonmagnetic toner. In this embodiment, two different color toner will be used for ease of explanation. In a case where black toner and chromatic color toner are used, it is preferable that the normal developing process using the color toner is employed for first developing process, and the reversal developing process using the black toner, for second developing process. This development system will prevent those toner from being mixed (the resultant image will otherwise be unclean), and secure a sharp black image. A bias voltage source 13 is connected to a color developing roll 12 of the color developing unit. A bias voltage Vb1 is applied from the bias voltage source 13 to the color developing roll 12. The color toner is positively charged. When |vo|>|Vb1|>|$V_{1R}$| (the polarity of these voltage is negative), the positively charged color toner is attracted to a portion of the photo receptor surface where the surface potential is more negative than the bias voltage Vb1. As a result, a first latent image is developed (normal development). A black developing roll 14 of the second developing unit is coupled with a bias voltage source 15 and receives a bias voltage Vb2 therefrom. The black toner is negatively charged. When |$V_{1R}$|>|Vb2|>|$V_{1R}$| (the polarity of these voltage is negative), the negatively charged black toner is attracted to a portion of the photo receptor surface where the surface potential is less negative than the bias voltage Vb2. As a result, a second latent image is developed (reversal development). In this way, the two different toner images are formed on the photo receptor 2. When two-component developer consisting of magnetic carrier and toner is used for the developer, the dynamic developer electric resistance is within $10^6$ to $10^{11}$ Ωcm, preferably $10^8$ to $10^{10}$ Ωcm, and the developing gap is within 0.2 to 2 mm, preferably 0.7 to 1.5 mm. With the selection of the resistance and the developing gap, one can avoid such an unwanted situation caused by the edge effect of the latent image, viz., the first toner is attached to the fringe of the second latent image and vice versa. The resultant toner images have good uniformity. Additionally, it is preferable to superpose an AC voltage of which the frequency is within the range of 200 to 5,000 Hz and the effective value is about ½ as large as (Vo–$V_{1R}$) or ($V_{1R}$–$V_{2R}$), on the bias voltage Vb1 or Vb2. The resultant images are high density images having no mixture of black and color toner and with less attachment of different toner to the fringes of the toner image.

The two different toner images thus formed on the photo receptor by the developing processes have charge polarities different from each other. The different polarities of the toner images must be arranged into the same polarity before the transfer of the images. This polarity arrangement is achieved by charging the toner images by a corona charger 16. The arranged polarity may be either positive or negative. It is negative in this embodiment. A negative high voltage source 17 is used for the polarity arrangement. The toner image thus negatively charged is first transferred onto a dielectric belt 19 as a second recording media, thereby forming a first-side toner image 25. Then, a second-side toner image 18 is formed on the photo receptor in a similar way. The first-side toner image 25 is transferred onto the dielectric belt 19 by a transfer stage 20, under the voltage from a high voltage source 21. The transferred toner image polarity is inverted to the positive polarity by a charger 22. In this case, a switch 23 connects the charger 22 to a high voltage source 24. The first-side toner image 25 is obtained in this way.

Then, a print paper 26 moves forward under an image sensor 27 and is registered by a registering roller 28, and advanced to the transfer stage. In the transfer stage 20, the print paper 26 is transported in a state that it is nipped between the drum with the photo receptor 2 wound therearound and the dielectric belt 19. During the transport of the print paper, the movement of the paper and the turn of the drum and the belt progress at a synchronous speed. The second-side toner image 18, negatively charged, is formed on the photo receptor 2, while the first-side toner image 25, positively charged, is formed on the dielectric belt 19. The corona charge polarity in the transfer stage 20 is positive. Accordingly, in the transfer stage, the first-side toner image 25 and the second-side toner image 18 are simultaneously transferred onto both sides of the print paper 26. A image-transferred print paper 29, which bears the first and second toner images transferred on both the sides thereof, passes through the nip of paired heat rolls 30 and 31 where both sides thereof are heated and the images are fused for fixing.

After the images have been transferred and fixed on both sides of the print paper 26, the charge and toner left on the dielectric belt 19 are removed. For the removal, a switch 33 is operated to drive a discharger 32 to connect an AC power source 34 to the discharger. As a result, the residual charge is removed and the belt surface is neutralized. Then, a cleaner 35 is brought into contact with the belt surface, thereby removing the residual toner. Here, the dielectric belt 19 is ready for receiving the next first-side toner image 25. The charge and toner left on the photo receptor 2 are removed by operating an eraser 36 (AC corona and/or uniform exposure), and then operating a cleaner 37, in preparation for the next image formation.

In this way, the two types of toner images can be printed on both sides of the print paper 26 in successive manner. The printing machine of the embodiment is able to print an image on one of the major sides of the print paper 26. The image formation on one side of the paper may be achieved by forming and transferring the first-side toner image 25 or the second-side toner image 18 onto the print paper 26. There is a case where another information or unnecessary print is already present on one of the major sides of the paper 26 (for example, a case where an image is printed on the reverse side of the paper). In this case, an image can be printed on only the necessary side of the paper in a manner that the printed or not printed side of the paper is sensed by an image sensor 27 and only the paper side on which the image is to be printed is selected according to the sensing result.

As already mentioned, the potential sensor 10 is used for controlling the surface potential of the photo receptor 2. To remove adverse influence by the reduction of sensor sensitivity owing to its aging, the output voltage of the sensor is constantly compared with a reference voltage for the adjustment for the deviated output voltage of the sensor. In this embodiment, a drum cap made of conductive material, which covers the vertical joint of the photo receptor 2, is set to a fixed voltage. This voltage is sensed by the potential sensor 10 and used for the comparison. In the circuit arrangement to effect this, a constant voltage element 39 and a capacitor 40, which are coupled with a drum cap 38, provide the fixed voltage. A leak resistor 41 serves as a safety resistor which provides a discharge path in the drum maintenance that will be done after the printing operation is stopped.

The embodiment shown in FIG. 1 employs the corona charger in the transfer stage 20. This may be substituted by a roll applied with voltage. In the modification, the radius of curvature of the dielectric belt 19, which is in contact with the photo receptor 2, may be reduced. The modification brings about the following advantages. The print paper 26 can be smoothly separated from the transfer stage. The required voltage of the high voltage source 21 may be low. The print paper 26 comes in contact with the photo receptor 2 in good contact conditions. In the present embodiment, to form the two different toner images (two color toner images), the charged surface of the photo receptor 2 is divided into substantially two voltage levels, and the latent images are developed using two different toner, positive toner and negative toner, by the normal and the reversal developing processes. It is evident that the invention may be applied to such a latent image forming apparatus that a plural of toner images (of different color images) are formed on the photo receptor 2 by repeating the exposure/developing process, i.e., the multi-developing process. In this case, the repeated developing process may be the normal developing process or the reversal developing process. Further, the charger 16 is omissible, which is used for arranging the polarities of the toner images into the same polarity before the transfer of the images. In the toner images having the same polarity but different absolute values and different distributions, the toner images are preferably charged again before the transfer of them. In the above-mentioned embodiment, through one turn of the drum, more than two toner images are formed on the Xerographic surface. If required, those toner images may be formed through plural turns of the drum. When a multi-or full-color image is formed using four colors, for example, black, magenta, cyan, and yellow, the drum is turned four times. During the course of forming the color image, the cleaner 37 must be left retracted. The embodiment described above uses the two developing units for forming two different toner images. Instead of the two developing units, a single developing unit may be used (see FIG. 6). In this case, the mixture of positively charged toner and negatively charged toner is used for the developer. The bias voltage applied is formed by superposing an AC voltage on a DC voltage. Also in the embodiment, the photo receptor 2 as the first recording media is shaped like a drum, and the dielectric belt 19 as the second recording media is shaped like a belt. Those recording media may be any of the combinations, drum-drum, belt-belt, and belt-drum. The second recording media, which is made of dielectric material in the above-mentioned embodiment, may be made of semiconductor or conductive material. If it is made of conductive material, the bias voltage source, used in the transfer stage, is connected to the second recording media of conductive material.

Figure 2:
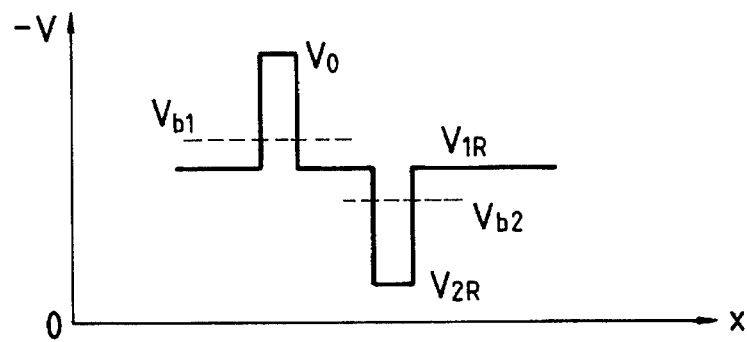
FIG. 2 is a graph showing a curve representing a variation of the surface potential of the photo receptor with respect to positions on the surface thereof, for explaining the formation of two different latent electrostatically charged images on the photo receptor by the duplex printer of FIG. 1.

FIG. 2 shows a variation of surface potential of the photo receptor with respect to positions thereon when the two different latent images are formed on the photo receptor as described referring to FIG. 1. In the graph of FIG. 2, the abscissa x represents positions on the surface and the y, the surface potential. The surface potential is negative since the photo receptor is negatively charged as recalled. In the figure, Vo represents a voltage level on the not exposed portion, $V_{1R}$ indicates a voltage level at the medium exposure level, and $V_{2R}$ is representative of a voltage level at the maximum exposure level. The potential difference (Vo–$V_{1R}$), caused by the medium exposure level, forms the latent image of first information, and the potential difference ($V_{1R}$–$V_{2R}$), caused by the maximum exposure level, forms the latent image of second information. The bias voltage Vb1 of the first developing unit is set so that |Vb1|>|$V_{1R}$| holds. The bias voltage Vb2 of the second developing unit is set so that |$V_{1R}$|>|Vb2| holds. Accordingly, the quantity of exposure light must be controlled so that the medium exposure level exists between the first and second bias voltages Vb1 and Vb2; otherwise, fog would occur in the background of the image. To avoid the fog formation, $V_{1R}$ is set to be about ½ as large as (Vo–$V_{1R}$), and the medium exposure light level is controlled on the basis of the result of sensing at least the surface potential $V_{1R}$ by the potential sensor 10. Preferably, Vo, $V_{1R}$ and $V_{2R}$ are sensed, and further the charging capability of the charger 3, the medium exposure light level of the exposure light source and the maximum exposure level must be controlled so that the sensed potentials become predetermined potentials. The potential sensor 10 (see FIG. 1) may continuously or intermittently sense the potentials by making use of, in the case of cut papers, the interval between papers, and in the case of continuous paper, an area outside the recording area on the paper.

(Embodiment 2)

Figure 3:
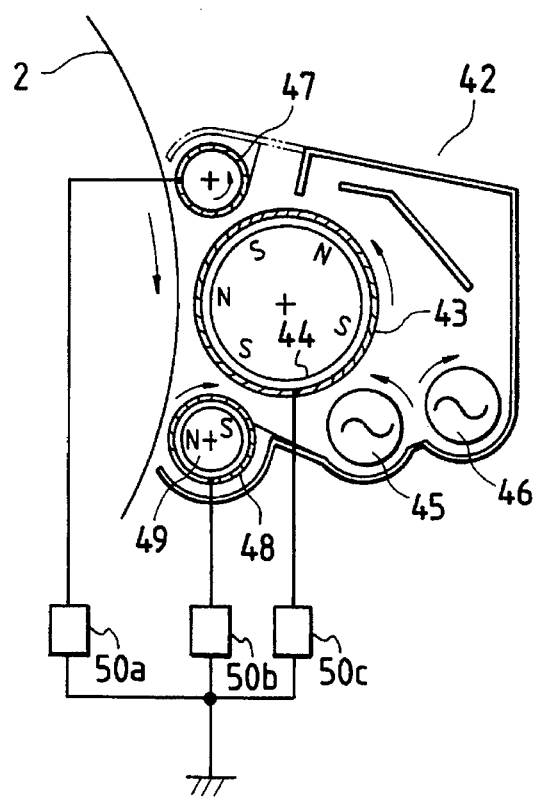
FIG. 3 is an explanatory diagram showing a toner image forming apparatus according to another embodiment of the present invention.

FIG. 3 is an explanatory diagram showing a toner image forming apparatus according to a second embodiment of the present invention. The figure illustrates the structure of a developing unit suitable to the development in the first embodiment of FIG. 1. In the developing unit using toner of powder particles, toner will be scattered outside the developing unit, cleaning, maintenance, or means to catch and collect the scattered toner is periodically required to remove the scattered toner. After used for a predetermined period of time, the developing unit is replaced with a new one. This results in increase of print cost. In the developing unit in which two types of development are carried out as shown in FIG. 1, scattered toner for one development will mingle with the toner for the other development. The developing unit shown in FIG. 3 to be described hereinafter succeeds in solving those problems, and eliminating the need of replacing the developing unit. The developing unit of the third embodiment employs two-component developer consisting of magnetic carriers and nonmagnetic or magnetic toner. As shown, a magnet roll 44 is fixedly mounted in a developing roll 43. The developing roll, when turned, transports the developer to the developing stage while magnetically attracting the developer. Screws 45 and 46 function to mix and agitate the toner in the developer so that the toner is uniformly distributed in the developer. Toner seal rolls 47 and 48, which are rotary, are disposed on both sides of the developing roll. Those two seal rolls are disposed in close proximity to the surface of the photo receptor 2, with a gap therebetween of 0.5 to 2 mm. The seal rolls thus disposed function to prevent toner from leaking from the developing unit, and to electrostatically and physically attract toner and return it to the developing unit.

To improve the electrostatic attraction, it is preferable to apply a DC voltage or a voltage resulting from superposing an AC voltage on a DC voltage to the seal rolls. In the illustration, to this end, bias voltage sources 50a and 50b are connected to the seal rolls, respectively. The bias voltage applied to the seal rolls may be derived from a bias voltage source for biasing the developing roll. In the developing unit using the magnetic carriers as in this embodiment, a magnet 49 is preferably located within the toner seal roll 48. Then, it will attract carriers attracted to the photo receptor and catch carriers flying out of the developing unit. When the magnetic toner is used, a magnet is preferably set also in the toner seal roll 47. In connection with the magnetic poles of the magnet roll 44, the toner seal rolls 47 and 48 are disposed, as shown, close to the magnetic poles of the magnet roll 44. Magnetic brushes formed by the magnetic poles brush toner from the toner seal rolls 47 and 48, and further prevent toner from being blown out of the developing unit. Toner or carriers attached to the toner seal rolls 47 and 48 can be completely removed therefrom by scraping it off the seal roller surfaces with a member like a blade. Within the toner seal rolls 47 and 48 the magnets 49 are each disposed such that, as shown, the magnetic pole of the roll and that of the magnet 44 in the developing roll 43, which is opposed to the former, have the same polarity, but the magnetic flux developed from the former is lower than that from the latter. Such a disposition of the magnets can efficiently return magnetic particles to the developing unit. In this embodiment, the magnet 49 is disposed within the toner seal rolls 48. Magnetic members not having magnetic poles, instead of the permanent magnet, may be placed at the locations of the magnetic poles. In this case, magnetic particles are attracted by the action of the magnetic induction. In the developing unit using nonmagnetic developer, the magnets 44 and 49 are not used. Also in this developing unit, provision of the toner seal rolls 47 and 48 on both sides of the developing roll 43 can prevent toner from being scattered. In the figure, reference numeral 50c represents a bias voltage source.

(Embodiment 3)

Figure 4:
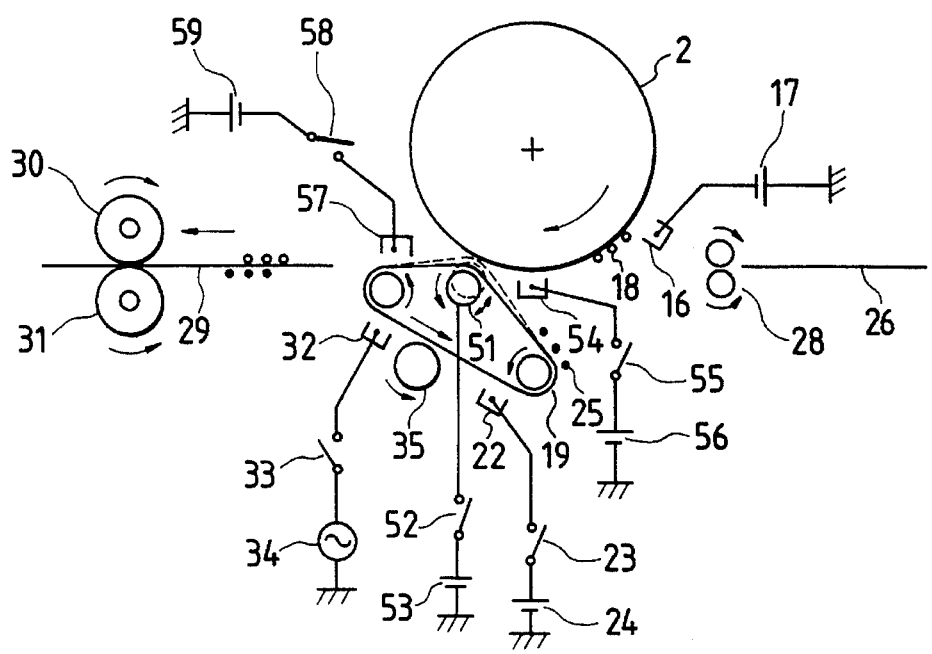
FIG. 4 is an explanatory diagram showing a toner image forming apparatus according to a further embodiment of the present invention.

FIG. 4 is an explanatory diagram showing a toner image forming apparatus according to yet another embodiment of the present invention. The apparatus illustrated is a duplex printing machine capable of prints toner images on both sides of a print paper. In this embodiment, the first-side toner image 25 and the second-side toner image 18 are formed on the photo receptor 2 in substantially the same manner as that of FIG. 1, but the process for transferring the toner images to the print paper 26 is different from that of FIG. 1. The first-side toner image 25 is first transferred to the dielectric belt 19 in a manner that the dielectric belt 19 is brought into contact with the photo receptor 2, and the voltage of a transfer power source 53 is applied through a switch 52 to a transfer roller 51. Thereafter, the charge polarity of the toner image is reversed to the positive polarity through the action of the charger 22. Then, the second-side toner image 18 is formed on the photo receptor 2 in a state that the dielectric belt 19 is detached from the photo receptor 2. The print paper 26 is registered by the registering roller 28 and brought forward to the photo receptor 2 bearing the second-side toner image 18. A transfer stage 54, a switch 55 and a high voltage source 56 cooperate to transfer the second-side toner image 18 on the upper surface of the print paper 26, which is in contact with the photo receptor 2. With further proceed of the print paper 26, the under surface of the paper comes in contact with the dielectric belt 19 bearing the first-side toner image 25. The first-side toner image 25 is transferred to the lower surface of the paper by the cooperation of a transfer stage 57, a switch 58 and a high voltage source 59. In this way, the toner images are formed on both sides of the paper. The fixture of the transferred toner images, and the removal of residual toner and charge on the dielectric belt 19 and the photo receptor 2 are carried out in substantially the same way as that of the FIG. 1 embodiment. The charge polarity of the first-side toner image 25 is reversed by using the charger 22. The reversing operation of the charge polarity is not essential. The polarity reverse may be omitted, or the toner image may be charged again in the same polarity. In this case, the polarity of the high voltage source 59 is reversed (in this instance, it is positive).

(Embodiment 4)

Figure 5:
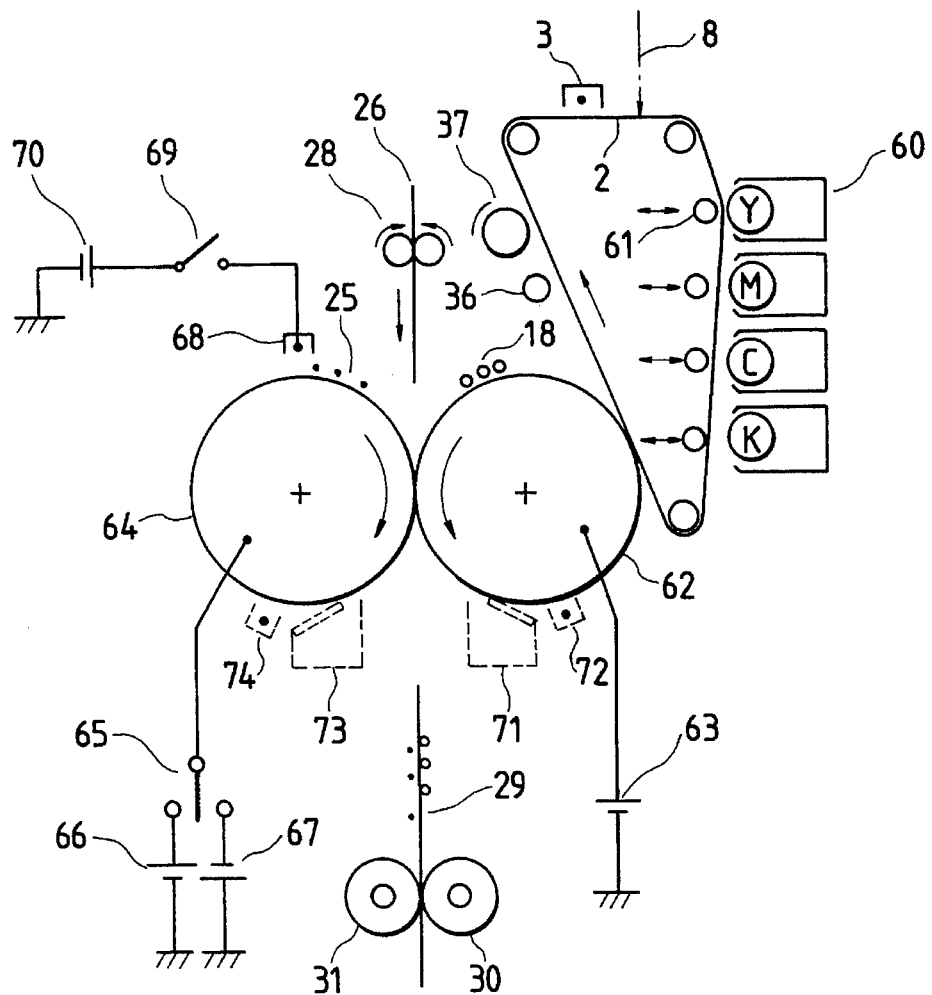
FIG. 5 is an explanatory diagram showing a toner image forming apparatus according to a still further embodiment of the present invention.

Referring to FIG. 5, there is shown still another embodiment of the present invention. The apparatus illustrated is capable of printing full color images on both sides of a print paper. The photo receptor 2 takes the form of a belt. To develop a latent electrostatic image formed on the photo receptor, one developing unit is first selected from among a group of color developing units 60 consisting of developing units of four colors, yellow, magenta, cyan, and black, and is developed by the selected color developing unit. Then, another color developing unit is selected and develops the toner image, and so forth. These color toner images thus developed are successively positioned on a transfer drum 62, whereby a first-side toner image 25 of full color is formed on the drum. The full color toner image is then transferred on a transfer drum 64. The transfer drums 62 and 64 are formed of aluminum base covered with elastic dielectric material. As shown, a group of development select structures 61 is disposed within a loop of the photo receptor 2 in a state that the development select structures are located in opposition to the color developing units arrayed outside and along the photo receptor loop, respectively. In forming the toner images of the respective colors on the photo receptor 2, the development select structures are selectively moved toward the corresponding developing units, to drive the developing units in successive order. With this construction, there is no need of moving the developing units. This fact implies that the high speed operation and reduction of cost to manufacture are realized in the toner image forming apparatus. The transfer of the toner image on the transfer drum 62 is carried out in connection with a transfer power source 63. The transfer of the toner image on the transfer drum 63 is carried out in connection with a transfer power source 66 selected by a switch 65. The voltage of the transfer power source 66 is set to be higher than that of the transfer power source 63. In the present embodiment, the charge polarity of the toner is negative at the time of development.

The second-side toner image 18 of full color is formed on the transfer drum 62 after the toner and charge left on the transfer drum 62 are removed by a cleaner 71 and a discharger 72. At this time, a switch 65 selects a non-transfer power source 67 the polarity of which is reverse to that of the transfer power source 66. A charger 68 is operated through a route of a switch 69 and a high voltage source 70 to reverse the charge polarity of the first-side toner image 25 (negative→positive). As a result, the first-side toner image 25 and the second-side toner image 18 are held on the transfer drum 62 and the transfer drum 64, respectively. Subsequently, the print paper 26, which has been registered and transported, is moved to the nip of the drums 62 and 64. The switch 65 selects the transfer power source 66 to connect it to the transfer drum 64. Then, the first-side toner image 25 and the second-side toner image 18 are simultaneously transferred on both sides of the print paper 26. The image-transferred print paper 29 thus having the toner images on both sides thereof are nipped with the paired heat rolls 30 and 31 where the toner images are fused and fixed on the print paper. The residual toner and charge on the transfer drums 62 and 64 are removed with the combinations of the cleaner 71 and the discharger 72, and the cleaner 73 and the discharger 74. After the removal of the residual toner and charge, those drums are ready for the next duplex printing operation. As a matter of course, those cleaner and dischargers 71, 72, 73 and 74 are not operated when the normal first- and second-side toner images 25 and 18 are absent on the transfer drums 62 and 64, respectively. In the description of this embodiment thus far made, the transfer drums 62 and 64 continually contact with each other. However, it is preferable to separate the transfer drum 64 from the transfer drum 62 when the second-side toner image 18 is formed on the transfer drum 62. In this case, the non-transfer power source 67 may be omitted. In this embodiment as mentioned above, the transfer drums 62 and 64 as the first and second recording medium are both made of dielectric material. Those drums may be made of semiconductor or one of the drums may be made of conductive material, for example, metal. Both the transfer drums may be shaped like belts or one of the drums may be shaped like a belt, while the other may be shaped like a drum.

In this embodiment, the full color print speed is ¼ as high as the development process speed since one full color toner image is formed through four turns of the transfer drum 62. The use of the tandem developing unit ensures the full color duplex print at the development process speed. Incidentally, the tandem development unit is arranged such that four latent images forming/development systems are disposed around a transfer/recording media like a belt or a drum (corresponding to the transfer drum 62). The color toner images are successively superposed on the media.

Thus, the present embodiment can print the toner images on both sides of the print paper through one passage of the paper through the machine as the embodiments of FIGS. 1 and 4 do. A data processing system, although not referred to in the description of the embodiments in FIGS. 1, 4 and 5, is used in addition to an optical modulation circuit. The data processing system including memories, readout circuits, and so on provides the functions of altering of the exposure start position, right-to-left writing and left-to-right writing. When a latent image is depicted on the photo receptor 2 with a laser beam, these functions are operated so that the images are located at correct positions.

(Embodiment 5)

Figure 6:
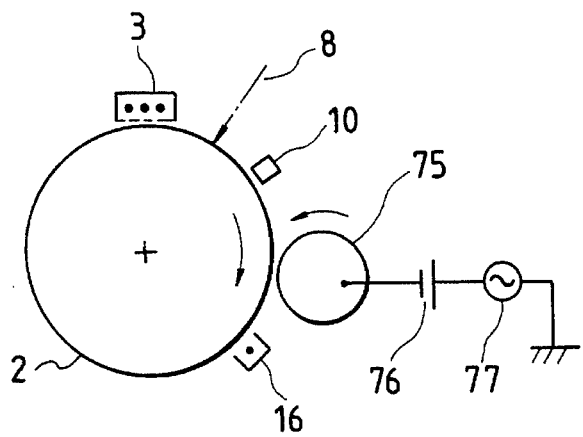
FIG. 6 is an explanatory diagram showing a toner image forming apparatus according to a yet still further embodiment of the present invention.

Referring to FIG. 6, there is shown a further embodiment of the present invention. The present embodiment is capable of developing two different toner images by a single developing unit, while the embodiment of FIG. 1 uses the two developing units for the same purpose. A two-color developing unit 75 uses a developer containing positively charged color toner and negatively charged black toner (only toner or the combination of toner and carriers). A bias voltage applied to the two-color developing unit is formed by superposing an AC voltage on a DC voltage. Accordingly, two bias voltage sources are used, a DC bias voltage source 76 and a AC power source 77. The DC bias voltage is substantially equal to the surface potential $V_{1R}$ shown in FIG. 2. The frequency of the AC voltage (including pulsative voltage) is within the range from 20 Hz to 5,000 Hz, and the effective value thereof is less than approximately ½ as large as $|V_0-V_{1R}|$ or $|V_{1R}-V_{2R}|$. The use of the DC and AC voltages so selected eliminates the fog in the background of the resultant image and the unwanted toner attachment caused by the edge effect. When two-component developer consisting of magnetic carriers and toner is used for the developer, the dynamic developer electric resistance (its electric resistance when the developer moves) is within $10^6$ to $10^{11}$ Ωcm, preferably $10^8$ to $10^{10}$ Ωcm, and the developing gap is within 0.5 to 2 mm, preferably 0.7 to 1.5 mm. With the selection of the resistance and the developing gap, the resultant image has a high density and less fog. In this embodiment, after the toner images of two colors (types) are formed using the mixture of two different toner positively and negatively charged, the toner left on the photo receptor 2 or the dielectric belt is collected by the cleaner and the collected toner is returned to the two-color developing unit 75 for reusing purposes. In the case where the two developing units are used, it is difficult to separate the used toner and return the separated toner to the developing unit.

In the embodiments as mentioned above, electrostatic force is used for transferring the toner images on the first and second recording medium, and on the final recording media (print paper). The toner images transferred on the final recording media are fixed thereon by using the paired heat rolls. Any of adhesion transfer, heat fusing transfer, mechanical sliding or pressure transfer and magnetic transfer (for magnetic toner) may be used in lieu of the electrostatic transfer. In the case of the fusion transfer, the fixing process may be carried out simultaneously with the transfer process. In the case of FIG. 5, for example, the transfer drums 62 and 64 are shaped like belts. On the rear side of one or both of the belts, a heater is disposed at the location corresponding to the transfer part. The toner images are transferred under pressure. In this way, both the thermal transfer and fixture of images are simultaneously carried out. Also in the thermal transfer/fixture, the first and second recording medium are not always the transfer medium. One of the recording medium may be a latent image recording media such as the photo receptor. In a specific example of this, the photo receptor, which is wound around the drum in the case of FIG. 1, is shaped like a belt. The first- and second-side toner images are formed by using the combination of the dielectric belt and the photo receptor belt, and are thermally transferred and fixed.

In the embodiments as mentioned above, the developer containing the toner of powder particles is used as toner image forming means for the duplex print. If necessary, the liquid developer may be used in place of the developer containing powder particles tone.

As described above, in the present invention, the first toner image is formed on the first recording media, and the first toner image is then transferred on the second recording media. Then, the second toner image is formed on the first recording media, and the first and second toner images are transferred on both sides of the final or third recording media (print paper). Therefore, one passage of the recording substance through the apparatus completes the duplex print.

[Embodiment 6]

Figure 7:
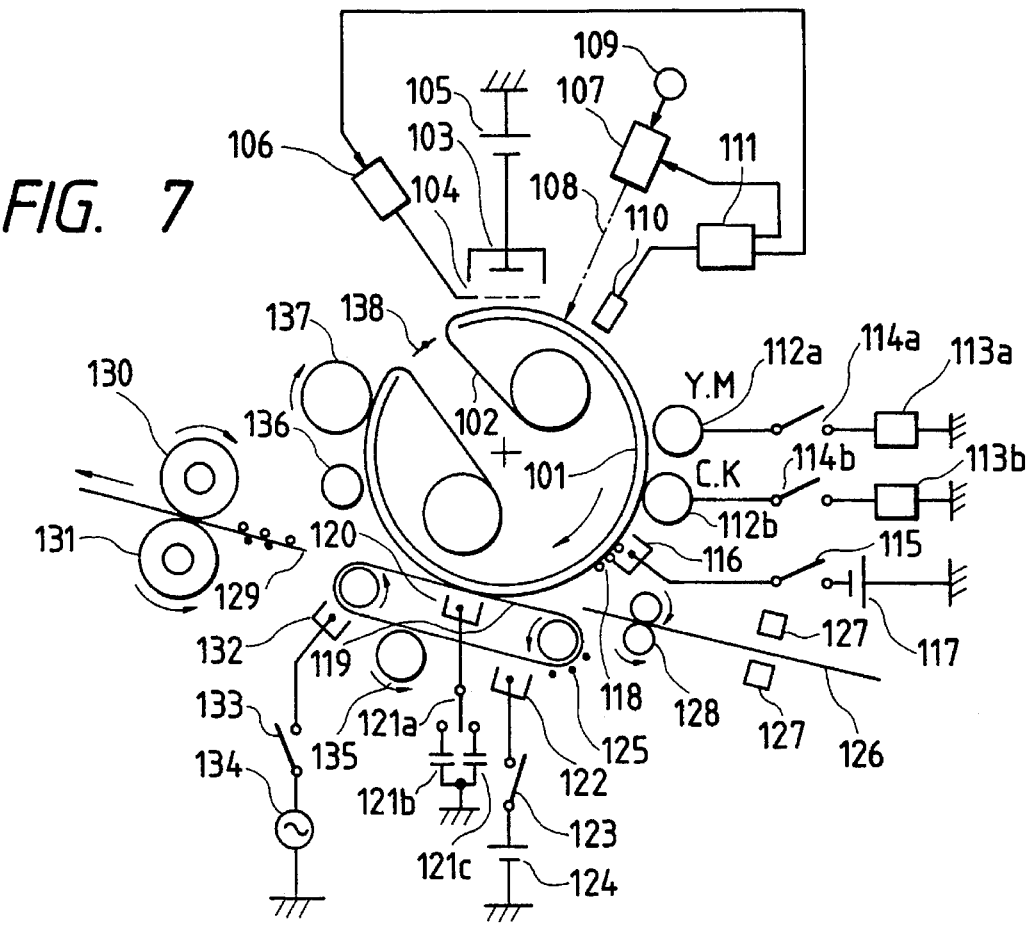
FIG. 7 is an explanatory diagram showing a toner image forming apparatus according to a yet still further embodiment of the present invention.

FIG. 7 is an explanatory diagram showing a toner image forming apparatus according to a still another embodiment of the present invention. In the toner image forming apparatus capable of printing images of monocolor, two colors, multi-color, or full color, a photo receptor is used as a first recording medium. For the developing system, a developer contains two types of toner (of e.g., two colors) of which the charge polarities are different from each other. Two different toner images are simultaneously developed by using the two types of toner. In the description to follow, the two types of toner are toner of two different colors. Toner of two different properties, e.g., magnetism and electric resistance, are available for the present invention. In this case, the resultant toner images have a single nature or the composition of different natures.

How a toner image of monocolor or two colors is recorded or printed on one side or both sides of a final recording media (e.g., print paper), will first be described.

As shown, the first recording media consists of a drum base 101 and a photo receptor 102, shaped like a belt, which is wound around the drum base 101. After a predetermined amount of the photo receptor 102 is used, the photo receptor is pulled out of the drum base 101. After used, it is put into the drum base 101 and rolled therein. With rotation of the drum, a corona charger 103 uniformly charges the surface of the photo receptor 102 around the drum base 101. The charger 103 includes a grid 104 for controlling the charge voltage, and a corona wire. The grid 104 is connected to a grid power source 106, and the corona wire is connected to a high voltage source 105. In this embodiment, the photo receptor 102 is negatively charged. Subsequently, the surface of the photo receptor 102 is illuminated with a laser beam 108 emitted from a laser light source 107, so that a latent electrostatic image corresponding to information to be recorded is formed on the photo receptor. At this time, the laser light source 107 is driven by a signal from a print information source 109.

Figure 8A:
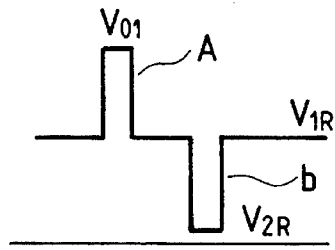

Also in this embodiment, in order to form two different toner images (e.g., images of two colors), two different latent images are formed through the illumination of the laser beam (as will be described in detail with reference to FIG. 8). In this case, two different latent images must be formed exactly within predetermined image areas on the photo receptor or Xerographic surface. This is achieved by properly controlling the surface potential of the photo receptor 102 charged by the charger 103 and the quantity of laser beam 108. To this end, a potential sensor 110 senses at least two of the following three surface potentials; the surface potential $V_{01}$ on the portion of the photo receptor where is not exposed to the laser beam, the surface potential $V_{1R}$ on the portion of the photo receptor 102 where is exposed to a first information source, and the surface potential (residual potential) $V_{2R}$ on the portion of the photo receptor where is exposed to a second information source. A controller 111 controls the grid power source 106 and the laser light source 107 so that $(V_{01}-V_{1R})$ and $(V_{1R}-V_{2R})$ are within predetermined ranges.

Those surface potentials are preferably selected in the following way. $(V_{01}-V_{1R})$ is approximately equal to $(V_{1R}-V_{2R})$, and the other surface potentials other than the surface potential $V_{01}$ are preferably about ½ as large as $V_{01}$, e.g., 200 to 500 V. Those selected values vary depending on the developing characteristics to be given later. In a case where the photo receptor is made of organic material, the surface potential $V_{2R}$ is selected to be within the range of 50 to 150 V, although it varies with ambient temperature and time. A measure is taken for the surface potential variation by the ambient conditions. In the measure, the surface potentials are detected and the differences ($V_{01}$–$V_{1R}$) and ($V_{1R}$–$V_{2R}$) are controlled according to the detected potential, as described above. In this way, the two different images can be stably obtained.

Next, the two latent images thus formed are developed using two types of toner, e.g., black toner and chromatic color toner. In a case where black toner and chromatic color toner are used, it is preferable that the normal developing process using the color toner is employed for first developing process, and the reversal developing process using the black toner, for second developing process. This development system will prevent those toner from being mixed (the resultant image will otherwise be unclean), and secure a sharp black image.

A first developing unit 112a is connected through a switch 114a to a bias voltage source 113a. A bias voltage applied to the first developing unit 112a is formed by superposing an AC voltage of which the frequency is within 200 to 5 kHz and the effective voltage is within 0 to 500 V on a DC voltage of about $V_{1R}$. The toner used is the mixture of yellow (Y) toner positively charged and magenta (M) toner negatively charged. The positive Y toner is attracted to the portion of the photo receptor surface where the negative surface potential is larger than the surface potential $V_{1R}$, while the negative M toner, to the surface portion where the surface potential is smaller than the surface potential $V_{1R}$. As a result, the two different toner images of Y and M colors are developed. A second developing unit 112b is connected through a switch 114b to a bias voltage source 113b. The toner used is the mixture of cyan (C) toner positively charged and black (K) toner negatively charged.

In some cases, it is preferable that the voltage and the frequency of the bias voltage source 113a are somewhat different from those of the bias voltage source 113b, respectively. Normally, those bias voltage sources may be designed to have the same specifications. In this case, a single bias voltage source is used in lieu of the two bias voltage sources. The switches 114a and 114b are used for selectively connecting the single bias voltage source to the first developing unit 112a or the second developing unit 112b. The use of the single bias voltage source contributes to simplification of the construction of the toner image forming apparatus. When the second developing unit 112b is selected, the two toner images of C and K colors can be developed as by the first developing unit 112a.

When two-component developer consisting of magnetic carrier and toner is used for the developer, the dynamic developer electric resistance is within $10^6$ to $10^{11}$ Ωcm, preferably $10^8$ to $10^{10}$ Ωcm, and the developing gap is within 0.2 to 2 mm, preferably 0.7 to 1.5 mm. With the selection of the resistance and the developing gap, one can avoid such an unwanted situation caused by the edge effect of the latent image, viz., the first toner is attached to the fringe of the second latent image and vice versa. The resultant toner images have good uniformity.

The AC voltage superposed on the bias DC voltage functions to separate the cohering toner of different colors or of the same color, thereby preventing color mixture and impeding the fog formation. For some type of developer, it may be omitted. The relationships between the colors and charge polarities referred to above are used by way of example.

The two different toner images thus formed on the photo receptor by the developing process have charge polarities different from each other. The different polarities of the toner images must be arranged into the same polarity before the transfer of the images. This polarity arrangement is achieved by charging the toner images by operating a switch 115 to connect a negative high voltage source 117 to a corona charger 116. The arranged polarity may be either positive or negative. It is negative in this embodiment. A negative high voltage source 117 is used for the polarity arrangement. The toner image thus negatively charged is first transferred onto a dielectric belt 119 as a second recording media, thereby forming a first-side toner image 125. Then, a second-side toner image 118 is formed on the photo receptor in a similar way. The first-side toner image 125 is transferred onto the dielectric belt 119 by a transfer unit 120, under the voltage from high voltage sources 121b and 121c. The transferred toner image polarity is inverted to the positive polarity by a charger 122. In this case, a switch 123 connects the charger 122 to a high voltage source 124. In this way, the first-side toner image 125 is obtained.

Then, a print paper 126 moves forward under an image sensor 127 and is registered by a registering roller 128, and advanced to the transfer unit. In the transfer unit, the print paper 126 is advanced in a state that it is nipped between the drum with the photo receptor 102 wound therearound and the dielectric belt 119. During the advancement of the print paper, the paper, the drum and the belt are moved and turned at a synchronous speed.

The second-side toner image 118, negatively charged, is formed on the photo receptor 102, while the first-side toner image 125, positively charged, is formed on the dielectric belt 119. The corona charge polarity in the transfer unit 120 is positive when the high voltage source 121c for applying voltage to the transfer unit 120 is selected by the switch 121a. Accordingly, in the transfer unit, the first-side toner image 125 and the second-side toner image 118 are simultaneously transferred onto both sides of the print paper 126. After the first and second toner images are transferred on both sides of the print paper, the print paper 129 passes through the nip of paired heat rolls 130 and 131 where both sides of the paper are heated and the images are fused for fixing.

After the images have been transferred and fixed on both sides of the print paper 126, the charge and toner left on the dielectric belt 119 are removed. For the removal, a switch 133 is operated to connect an AC power source 134 to a discharger 132, thereby driving the discharger. After the residual charge is removed and the belt surface is neutralized, a cleaner 135 is brought into contact with the belt surface, thereby removing the residual toner. Here, the dielectric belt 119 is ready for receiving the next first-side toner image 125. The charge and toner left on the photo receptor 102 are removed by operating an eraser 136 (AC corona and/or uniform exposure), and then operating a cleaner 137, in preparation for the next image formation.

In this way, the two types of toner images can be printed on both sides of the print paper 126 in successive manner. The printing machine of the embodiment is able to print an image on one of the major sides of the print paper 126 in a manner that the first-side toner image 125 or the second-side toner image 118 is formed and transferred onto the print paper 126. In a case where another information or unnecessary print is already present on one of the major sides of the paper 126 (for example, a case where an image is printed on the reverse side of the paper), an image can be printed on only the necessary side of the paper. This is done in a manner that the printed or not printed side of the paper is sensed by an image sensor 127 and only the paper side on which the image is to be printed is selected according to the sensing result. In the embodiment as mentioned above, the toner images of two colors are formed on both sides of the print paper. The toner images may be formed in other ways. The toner images of two colors or one color are formed on one side of the print paper. The toner images of one color are formed on one side thereof. The toner images of one color are formed on both the sides. The toner images of a color are formed on one side thereof, while the toner images of a color different from that on the first side are formed on the other side.

As already mentioned, the potential sensor 110 is used for controlling the surface potential of the photo receptor 102. To remove adverse influence by the reduction of sensor sensitivity owing to its aging, the output voltage of the sensor is frequently compared with a reference voltage for the adjustment for the deviated output voltage of the sensor. In this embodiment, a drum cap made of conductive material, which covers the vertical joint of the photo receptor 102, is set to a fixed voltage. This voltage is sensed by the potential sensor 110 and used for the comparison. Connection of a constant voltage element and a capacitor to the drum cap 138 provides a fixed voltage.

The embodiment as described above employs the corona charger in the transfer unit 120. This may be substituted by a roll applied with voltage. In the modification, the radius of curvature of the dielectric belt 119, which is in contact with the photo receptor 102, may be reduced. The modification brings about the following advantages. The print paper 126 can be smoothly separated from the transfer unit. The required voltage of the high voltage source may be low. The print paper 126 comes in contact with the photo receptor 102 in good contact conditions.

Also in the embodiment, the photo receptor 102 as the first recording media is shaped like a drum, and the dielectric belt 119 as the second recording media is shaped like a belt. Those recording media may be any of the combinations, drum-drum, belt-belt, and belt-drum. The second recording media, which is made of dielectric material in the above-mentioned embodiment, may be made of semiconductor or conductive material. If it is made of conductive material, the bias voltage source, used in the transfer unit, is connected to the second recording media of conductive material.

The basic construction of the toner image forming apparatus according to the present invention has been described referring to FIG. 7.

Description to follow is how to print the toner images of a monocolor, two colors, multi-color, and full color in the basic construction of the invention. It is assumed that the colors and the charge polarity of toner of the first and second developing units 112a and 112b are the same as those as referred to above.

The toner image of one color, any of Y, M, C, and K, can be printed on the print paper 126 after a latent electrostatic image is formed by the exposure process and a toner image is formed on the photo receptor by a selected developing unit. In this case, the toner image can be transferred on the print paper 126 without operating the corona charger 116, if the negative high voltage source 121b or the positive high voltage source 121c is selected by the switch 121a according to the charge polarity of the toner, and a high voltage from the selected voltage source is applied to the transfer unit 120.

In the case of negative K toner, for example, the negative high voltage source 121b is selected. Selection of the voltage source creates the following advantages. When the toner image is charged by the corona charger 116, the toner image is not deformed; otherwise, it is somewhat deformed. The toner of different polarities prevents the transfer of the toner of mixed colors. No or little foggy toner is transferred. A gross amount of ozone, generated by the corona charger, is reduced.

The toner images of two colors, Y and M, and C and K, can be printed on the print paper 126 through one development and one transfer, by only the selection of the first or second developing unit 112a or 112b, as already described. Other combinations of two toner colors, such as M and C, and Y and K, or Y and C, and M and K, may be selected by properly changing the color combinations of the developing units.

To print the toner images of two colors, multi-color, or full color, the toner images of one or two colors are first transferred onto the dielectric belt 119. Subsequently, the toner images of another color or colors are registered and transferred, and the resultant toner images are printed on the reverse side of the print paper 126. To print full color images, for example, the Y and M toner images are developed by the first developing unit 112a, and transferred on the dielectric belt 119. Then, the C and K toner images are developed by the second developing unit 112b and transferred to the dielectric belt 119 after registered.

In this case, the best combination and order of colors are (Y, M) and (C, K), and the images are formed in this order. In the light of color development in the full color, it is desirable that one toner is placed on the other. In the color combinations as just mentioned, Y toner may be laid on C toner, and M toner, on C toner. The color reproduction range is broadened. Y toner cannot be laid on M toner. The color M is akin to red as the superposed Y and M colors. Red can be reproduced with the side-by-side placement of Y and M. As for the color order, the colors are preferably developed in the order of values from high to low. If so developed, the toner layer of high value color serves as the top toner layer on the print paper. It is for this reason that the combination and order of (Y, M) and (C, K) are desirable.

The requirement for the registering accuracy is alleviated when the combination of (Y, M) and (C, K) is used and an image processing is used for separating black from the colors. The reason for this follows. The toner of colors M and C will not be placed on the toner of black K. The toner of M and C are written one time. In this respect, no displacement of the toner images occurs, while the toner images displacement inevitably takes place where these are transferred two times. In the superposition of the colors M, C, and Y, the color Y is not distinguished visually. Accordingly, it creates no problem in practical use.

As described above, the toner image forming apparatus of the invention can print toner images of one color and specific two colors on the obverse side and/or the reverse side of the print paper 126, through one image transfer operation from the photo receptor 102. Further, through two image transfer operations from the photo receptor, the apparatus can print toner images of two colors, multi-color or full color on the reverse side of the print paper 126. Those prints may be selectively used.

Another forming process of a multi-color or full color image using the toner image forming apparatus of FIG. 7 will be described. In the color image forming process, a toner image of one color is formed on the photo receptor 102, and then is transferred on the dielectric belt 119. Then, the toner image of another color is formed on the photo receptor, and is registered with the toner image already transferred. This process is repeated the number of times corresponding to the number of toner colors used. The resultant toner image is transferred on the reverse side of the print paper 126. For example, toner images of colors Y, M, C and K are transferred on the dielectric belt 119 four times in the order of values from high to low. In this case, the color toner of those colors are superposedly formed. Accordingly, the resultant color image has a broad color reproduction range. The corona charger 116 may individually charge the toner images of four colors before the image transfer. To lessen stress on the photo receptor 102 and to prevent deterioration the image quality, it is preferable to operate the corona charger only when the toner image is formed under the condition of the same polarity as that of the voltage applied to the transfer unit 120.

A further color image forming process using the FIG. 7 apparatus will be described.

In the image forming processes as mentioned above, the toner image up to two colors can be formed on the photo receptor 102, through the latent image formation of one time. However, the construction of FIG. 7 can form a full color image on the photo receptor, through the two to four processes of forming latent images, and transfer the full color image on the print paper 126 or the dielectric belt 119. Accordingly, it can print the full color image on both sides of the print paper.

An image forming process to form a full color image through two processes of forming latent images will first be described. As described above, latent electrostatic images corresponding to two colors are formed on the photo receptor 102 by exposing the photo receptor surface to the laser beam modulated with two pieces of information. The first developing unit 112a is operated to form toner images of Y and M colors. The charger 103 is operated again to charge the photo receptor 102, without operating the corona charger 116, the dielectric belt 119, and the cleaner 137 (the dielectric belt 119 and the cleaner 137 are not in contact with the photo receptor 102). The surface of the photo receptor 102 is exposed to the laser beam modulated with other pieces of information, thereby forming latent electrostatic images of other two colors on the surface of the photo receptor. The second developing unit 112b is operated to develop the toner images of C and K colors after these color toner images are registered with the already developed toner images of Y and M. Accordingly, the second development is preferably a soft development or is carried out in a state that the developer does not touch the surface of the photo receptor 102. In this way, the full color image is formed on the photo receptor. After the polarities of the full color image are arranged into the same polarity by the corona charger 116, the full color image is transferred on the print paper 126 or the dielectric belt 119. In this image forming process, during the course of the second formation of the toner image, the exposure progresses in a state that the toner image is present on the photo receptor 102. Then, the preferable color order in the image formation is: the colors (Y, M), which having higher values and better transparency, follows the colors (C, K).

A process of forming a full color toner image on the photo receptor 102 after the process for forming and developing latent images is repeated three or four times, will be described. As in the previous case, the photo receptor drum is turned two times for forming the toner images on the photo receptor 102 in a superposed manner. However, in this instance of the embodiment, the color toner image is superposed on the previously formed color toner image every turn of the drum. To be more specific, during the first turn of the drum, a latent image for the color Y is formed and developed with Y color toner in the first developing unit 112a. During the second turn, a latent image for the color M is formed, registered with the previous developed toner image, and developed with M color toner in the first developing unit 112a. During the third turn, a toner image of the color C is formed by the second developing unit 112b in a similar way. If necessary, a toner image of K is formed during the fourth turn of the drum. A full color image thus formed on the photo receptor 102 is transferred on the print paper 126 or the dielectric belt 119.

This image forming process can realize a broader color reproduction range since the toner image is superposed on the previous one every toner color, when comparing with the color image forming process in which the toner images of two colors are formed every turn of the drum. In the image formation, as in the previous instance, the colors are preferably ordered from high values and high transparency to low ones in order to reduce the toner shield effect at the time of exposure and further unnecessary, different color toner to enter the developing unit. In the second and subsequent developments, it is preferable that the photo receptor 102 softly touches the developer or does not touch it.

Specific types of color image forming processes of one color to full color that can be carried out by the toner image forming apparatus shown in FIG. 7 have been described. The toner image forming apparatus may be designed so that some of those color image forming processes are selectively used. The apparatus so designed is capable of printing a color image of satisfactory image quality at a proper printing speed and in desired print modes (of monocolor, specific colors, two colors arbitrarily selected, multi-color, full color, one side or both sides).

FIG. 8(*a*) to 8(*c*) shows graphs showing curves representing potential distributions of latent electrostatic images formed on the photo receptor. FIG. 8(*a*) shows a potential distribution when toner images of two colors are formed in the basic construction shown in FIG. 7. The surface of the photo receptor is charged at the potential $V_{01}$. Then, the surface is exposed to the laser beam to simultaneously form a first latent electrostatic image A and a second latent electrostatic image B on the photo receptor surface. That is, the surface potential $V_{01}$ is divided into substantially two voltage levels. The surface potential of the photo receptor at the medium exposure level is denoted as $V_{1R}$. The surface potential at the maximum exposure level is denoted as $V_{2R}$. The residual voltage level of the photo receptor is substantially equal to the surface potential $V_{2R}$. The latent images A and B thus formed are developed with toner of different colors and toner of different charge polarities, thereby forming toner images of two colors. A bias potential substantially equal to the surface potential $V_{1R}$ is applied to the developing unit. As a result, the toner having the same charge polarity as that of the photo receptor is attracted to the portion B, while the toner having the charge polarity opposite to that of the photo receptor is attracted to the portion A.

Figure 8B:
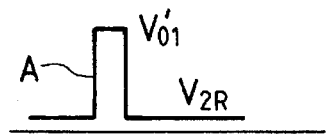
Figure 8C:
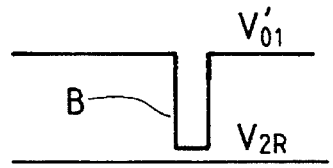

FIG. 8(*b*) and 8(*c*) show graphs showing desirable potential distributions of latent electrostatic images when a monocolor image is printed. FIG. 8(*b*) shows a potential distribution of the latent image when it is developed with toner of which the charge polarity is opposite to that of the photo receptor (normal development). FIG. 8(*c*) shows a potential distribution of the latent image when it is developed with toner having the same charge polarity as that of the photo receptor (reversal development). In the case of FIG. 8(b), the surface of the photo receptor is charged at potential $V_{01}'$, and the charged surface thereof is exposed to reduce the surface potential to potential $V_{2R}$, thereby to form a latent electrostatic image A. Then, voltage of about $V_{2R}$ is applied, with a bias voltage of the DC component during the development. Consequently, toner is attracted to the portion A. In the case of FIG. 8(c), a latent image B is formed by an exposure process. Then, voltage of about $V_{01}'$ is applied, with a bias voltage of the DC component during the development. Consequently, toner is attracted to the portion B. Those image forming processes lessen stress on the photo receptor when it is charged, and reduce the color mixture during the development and fog formation.

(Embodiment 7)

Figure 9:
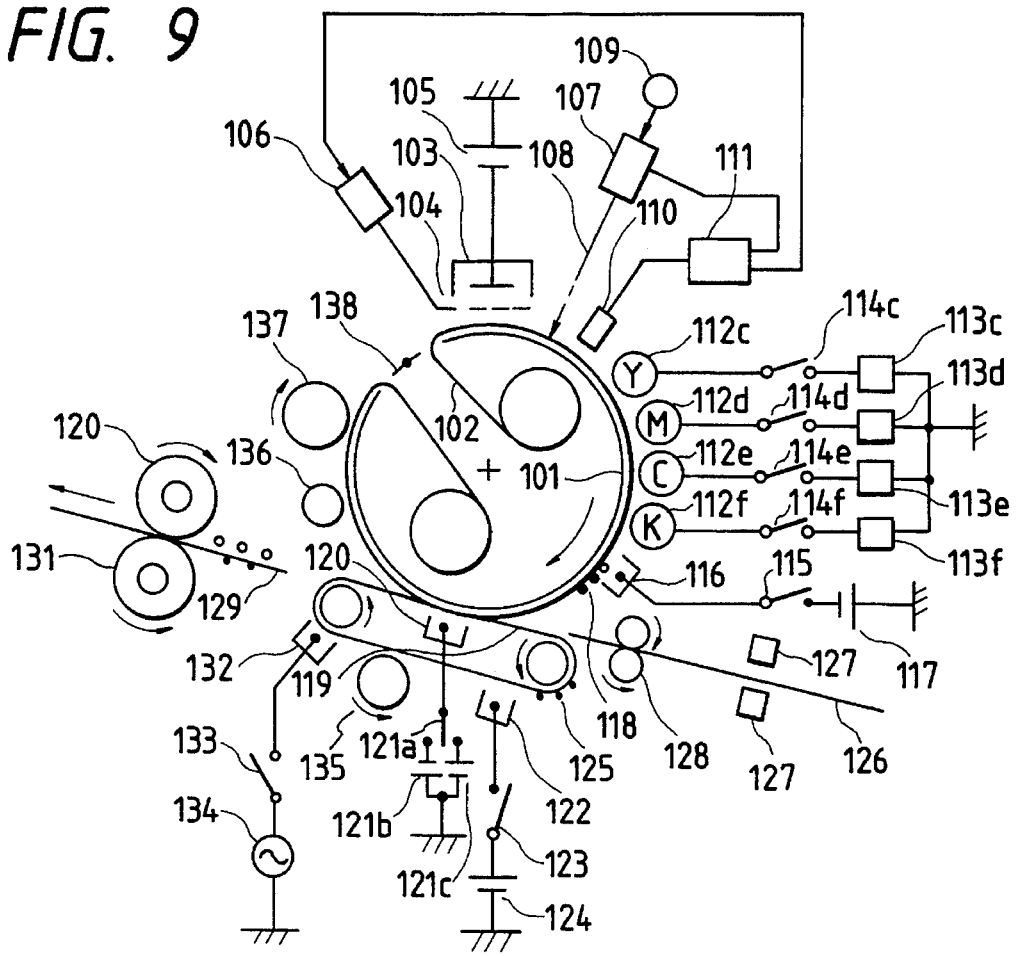
FIG. 9 is an explanatory diagram showing a toner image forming apparatus according to another embodiment of the present invention.

FIG. 9 shows still another embodiment of the present invention. The construction of the this embodiment is substantially the same as that of FIG. 7, except that the developing units, selectively used in successive order, are provided for the toner colors in one-to-one correspondence. To be more specific, four developing units 112c, 112d, 112e, and 112f are provided for the toner colors Y, M, C and K having the same polarities as those in FIG. 7. Those developing units 112c, 112d, 112e, and 112f are respectively connected through switches 114c, 114d, 114e, and 114f to bias voltage sources 113c, 113d, 113e, and 113f (Alternatively, a resistor distributer receives one power source and distributes proper voltages as bias voltages to the developing units through switches). In the first latent image forming process (first turn of the drum), latent electrostatic images for toner colors Y and M are formed, and the Y and M developing units 112c and 112d are simultaneously operated to develop the latent images with Y and M toner on the photo receptor 102. The relationships between the potential variation of the latent images and developing bias voltages will be described later with reference to FIGS. 10(a) to 10(c).

Any of other color combinations C and K, M and C, and Y and K is allowed in the first latent image forming process. Accordingly, the toner image forming apparatus of this embodiment has the following advantages. The number of combinations of specific two colors (the color combinations causing no displacement of the developed color toner images, in this instance, M and Y, C and K, M and C, and Y and K) is increased. An increased number of color combinations in the color order is obtained. The adjustment of the development characteristics of the respective colors is easy, minimizing unwanted color mixture and fog (this will be described later with reference to FIGS. 10(a) to 10(c)). Accordingly, the selection of print modes and image qualities may be made as in FIG. 7.

Figure 10A:
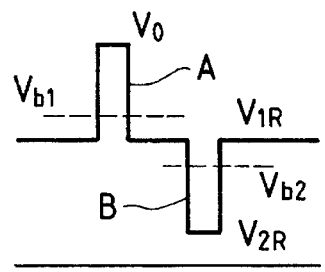
Figure 10B:
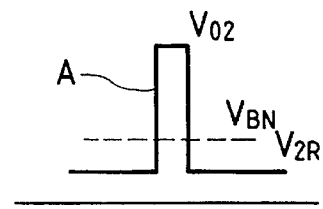
Figure 10C:
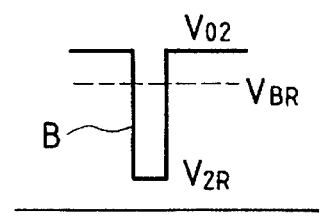

FIGS. 10(a) to 10(c) show graphs showing the relationships between latent electrostatic images formed on the photo receptor, and bias voltages (DC components) applied to the developing units at the time of development when the toner image forming apparatus constructed as shown in FIG. 9 is operated for printing purposes. In the figure, the polarity of the voltage is negative since the photo receptor is negatively charged.

In FIG. 10(a) showing the case where toner images of two colors are developed through one-turn latent image formation, two developing units, e.g., the Y-color developing unit 112c and the M-color developing unit 112d (see FIG. 9).

Also in this embodiment, the charge polarities of the Y- and M-color toner are positive and negative. A bias voltage $V_{b1}$ higher than the medium exposure level $V_{1R}$ of the latent image is applied to the Y-color developing unit. A bias voltage $V_{b2}$ lower than the maximum exposure level $V_{2R}$ is applied to the M-color developing unit. As a result, the Y-color toner is attracted to the portion A, and the M-color toner is attracted to the portion B. In the development, one of the developing units is operated since the current print mode is a monocolor print mode.

When an AC voltage is superposed on each DC bias voltage as in the case of FIG. 7, the developing efficiency is improved, and minimization of the mixture of unnecessary color toner and fog occurrence as well is realized.

When the developer is a two-component developer consisting of magnetic carriers and toner, it is preferable that the carriers are made of ferrite, magnetite or iron particles of 50 to 150 μm in average particle diameter, and the developer has dynamic electric resistance is within $10^6$ to $10^{11}$ Ωcm, preferably $10^8$ to $10^{10}$ Ωcm, and the developing gap is within 0.5 to 2 mm, preferably 0.7 to 1.5 mm.

FIGS. 10(b) and 10(c) show preferable potential distributions of latent electrostatic images in connection with bias voltages (DC components) applied to the developing unit when they are developed with monocolor toner in the toner image forming apparatus shown in FIG. 9. When the cases of FIGS. 10(b) and 10(c) are applied to the case of FIG. 10(a), the case of FIG. 10(b) corresponds to the case using the Y-color developing unit, and the case of FIG. 10(c), to the case using the M-color developing unit. Bias voltages $V_{BN}$ and $V_{BR}$ are applied to those developing units, respectively. As a matter of course, AC voltages may be superposed on the DC bias voltages. The voltage of the charger 103 applied when it charges the photo receptor 102 (see FIG. 9) is $V_{01}$ in the case of FIG. 8(a), and is approximately ½ as large as the voltage $V_{01}$ in the cases of FIG. 10(b) and 10(c). The result is to reduce the stress on the photo receptor and to elongate the lifetime of the photo receptor.

When comparing with the construction of the toner image forming apparatus shown in FIG. 7, the instant embodiment can set the value of the bias voltage applied to the developing unit every toner color. Accordingly, more various types of developers and photo receptors can be used, and it is possible to more readily control the image quality. In the case of FIGS. 10(a) or 10(c), the photo receptor of high residual voltage $V_{2R}$ can be used when comparing with the case of FIG. 8(b) or 8(c). In addition to the cases of FIGS. 10(b) and 10(c), the case of FIG. 10(a) can also be used for the monocolor print, when it is operated while omitting one of the exposure information. In any of the cases, the polarity of the voltage applied to the transfer unit 120 (see FIG. 9) may be set to be the same as the toner charge polarity.

In addition to the advantages referred to in the construction of FIG. 7, the toner of different colors and polarities can be separated from each other by attaching them to the photo receptor at the time of development. The toner attached to the photo receptor are not transferred to the print paper, since the polarities of the toner are different from each other, and hence affect no influence on the final image. If in the case of FIG. 10(b), the M-color toner has entered the Y-color developing unit, the M-color toner is attracted to the portion $V_{2R}$, which is lower than the bias voltage $V_{BN}$. The Y-color toner is attracted to the portion A at $V_{02}$. In the transfer stage, only the Y-color toner is transferred onto the print paper. The mixed toner of the different color is left on the photo receptor, and is removed by the cleaner 137.

(Embodiment 8)

FIG. 11 is a view showing other chargers used in the toner image forming apparatus according to the present invention. The chargers illustrated are a charger adaptable for the corona charger 116 for arranging the charge polarities of the toner and the quantities of charge thereof into the intentional charge polarity and the intentional quantity, a charger adaptable for the charger for setting the quantity of charge of the toner to the fixed quantity, and a charger adaptable for the charger 103 operated in a state that the residual voltage and toner are left on the photo receptor (for example, in the process where color toner images are superposedly formed on the photo receptor).

Figure 11A:
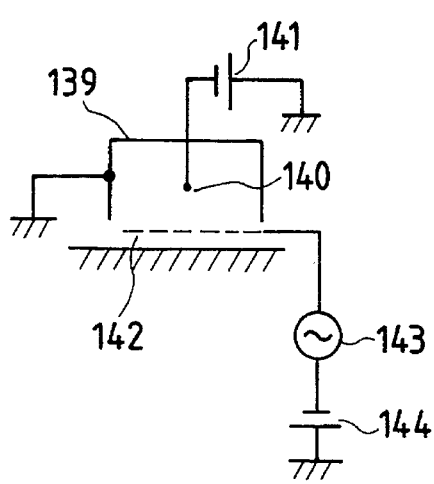

The charger shown in FIG. 11(a) is comprised of a shield electrode 139, a corona wire 140 and a screen grid 142. A DC power source 41 used for corona discharge is connected between the shield electrode 139 and the corona wire 140. The screen grid 142, an AC power source 143, and a voltage control power source 44 are connected in series.

In the charger thus arranged, the surface of an object to be charged is charged to have a voltage approximately equal to the voltage of the voltage control power source 144. It has a saturation characteristic. If the surface of the charged object has been previously charged, with its charge distribution being not uniform, it can be uniformly charged for a short time since the AC voltage is superposed on the DC voltage. Normally, the voltage of 4 to 7 kV is applied to the corona wire 140. The DC voltage applied to the screen grid 142 is 200 to 100 V. The AC voltage superposed on the DC voltage has the frequency of 100 to 5000 Hz, and the effective voltage of 100 to 800 V.

Figure 11B:
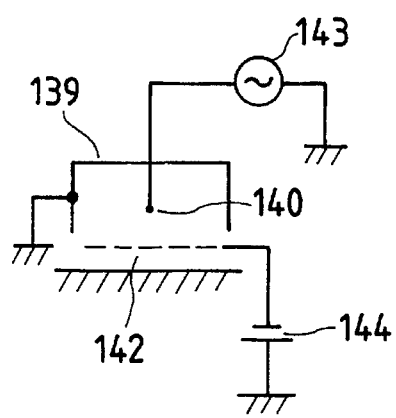

In the charge shown in FIG. 11(b), the AC voltage having the effective voltage of 3 to 6 kV and the frequency of 200 to 1000 Hz is applied to the corona wire 140. The DC voltage of 200 to 1000 V is applied to the screen grid 142. The charger thus arranged is capable of charge the surface of the charged object up to the voltage approximately equal to the voltage of the magnet roll 144. Since the corona wire 140 generates an AC corona, the surface of the charged object can be uniformly charged if some part of the surface potential of the charged object exceeds the control voltage before it is transferred.

Figure 11C:
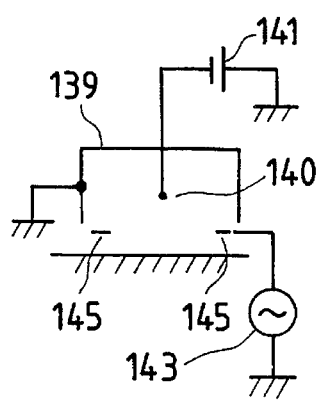

In the charger shown in FIG. 11(c), an auxiliary electrode 145 is provided at the open end of the shield electrode 139, and an AC voltage is applied to the auxiliary electrode as in the charger of FIG. 11(a). The charger of this instance is capable of preventing the surface of the charged object from being excessively charged and promoting the uniform charging.

Figure 11D:
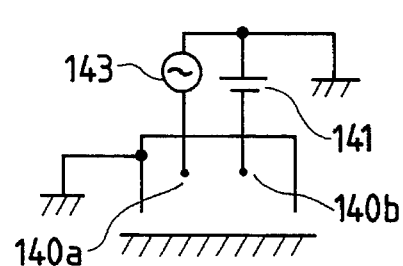

In the charge shown in FIG. 11(d), two corona wires 140a and 140b are provided within the constant voltage element 139. The corona wire 140a, located at the input part of the charger, is coupled with an AC voltage of which the effective voltage is 3 to 6 kV and the frequency is 100 to 5000 Hz. The corona wire 140b, located at the output part of the charger, is coupled with a DC voltage of 4 to 7 kV. In the charger thus arranged, the surface voltage of the charged object is reduced to a low voltage level by the AC corona in the input part of the charger. Then, the surface is charged up to a desired voltage by the DC corona in the output part. Accordingly, if the voltage on some part of the surface of the charged object exceeds a predetermined voltage, the surface can be uniformly charged.

In a case where toner of different polarities are present on the surface of the photo receptor and the different polarities and the quantities of the charge must be arranged into the same polarity and the same quantity, the arrangements using the AC corona as shown in FIGS. 11(a) to 11(d), particularly FIGS. 11(b) and 11(d), is preferably used.

In the constructions shown in FIGS. 7 and 9, the photo receptor is repeatedly used. Increase of the residual voltage, which results from fatigue of the photo receptor, must be minimized in order to obtain stable color images successively. In the case of the photo receptor having the multi-layer structure of two to three layers, generation and storage of residual voltage tend to occur in the charge transport layer and the surface protect layer. In such a case, the erasing light from the eraser 136 used in the constructions of FIGS. 7 and 9 is absorbed not only by the charge generation layer but also by the charge transport layer and the surface protecting layer. As a result, optically excited carriers are generated in those layers. Generation of those carriers represses the increase of the residual voltage.

(Embodiment 9)

Figure 12:
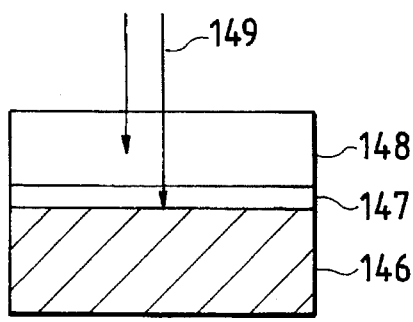
FIG. 12 is a view showing an organic photo receptor of the two layer type used in the toner image forming apparatus of the invention.

FIG. 12 is a view showing another photo receptor used in the toner image forming apparatus of the invention. The photo receptor is an organic photo receptor of the two layer type in which a charge generation layer 147 and a charge transport layer 148 are layered on a conductive substrate 146. Erasing light 149 consists of a first light component (of 650 nm in wavelength) and a second light component (of 550 nm in wavelength). Most of second light component of the erasing light 149 passes through the charge transport layer 148 to reach the charge generation layer 147. The erasing light 149 reaching the charge generation layer 147 generates optically excited carriers in the charge generation layer. Part of the second light component is absorbed in the charge transport layer 148 where it generates optically excited carriers in the layer 148. The erasing light 149 used is the erasing light of the two wavelength type or light of which the wavelength is within the range from 550 to 650 nm (yellow). Use of such erasing light represses increase of the residual voltage and prevents the formation of after images. In a case where the information record light source is a laser or LED light source of which the wavelength ranges between 600 to 900 nm, and the recording media is a photo receptor of the multi-layer type of which the major sensitivity lies in the vicinity of that wavelength region, as in the embodiments of FIGS. 7 and 9, the erasing light 149 preferably contains a light component of wavelength shorter than that of the information record light source.

As described above, each of the embodiments as mentioned above comprises a step for forming one or more types of toner images on the first recording media and directly transferring the toner image or images on a print paper, and a step for transferring the toner image or images on the second recording media in a composite manner, whereby selectively printing a toner image or images. The types of toner used may be the combination of red, green, blue, and black or the combination of desired colors and other physical properties, in addition to the combination of yellow, magenta, cyan, and black. Each embodiment employs the image forming process in which one latent electrostatic image is formed on the basis of the modulation by two pieces of information, and is developed with two types of toner having different charge polarities. Alternatively, one latent electrostatic image is formed on the basis of the modulation by one piece of information, and is developed with toner of one charge polarity (normal development or reversal development). This process is repeated to form one or more types of toner images on the first or second recording media.

Thus, the toner image forming apparatus of the present invention comprises: means for selectively forming plural types of toner images on a first recording media; means for transferring the toner images on a second recording media; means for moving a final recording media between the first and second recording medium; and means for selectively transferring the toner images on the obverse or the reverse side of the final recording media.

With such a construction, plural types of toner images that are desired can be formed for the shortest time in successive order.

(Embodiment 10)

Figure 13:
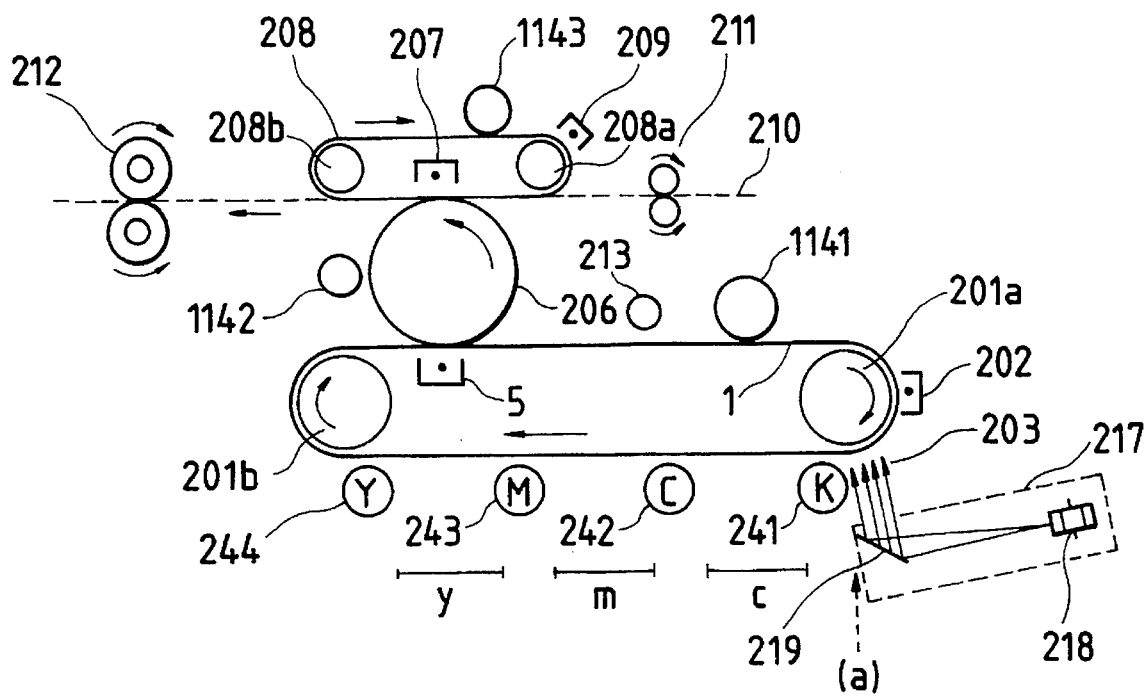
FIG. 13 is a view showing a color printer according to a yet still further embodiment of the invention.

FIG. 13 is a view showing a color printer according to a still further embodiment of the invention.

This embodiment, which relates to a high speed, duplex print, color laser printer based on the Xerographic printing process, will be described in details.

In FIG. 13, reference numeral 201 designates a photo receptor belt; 201a and 201b, drive rolls for driving the photo receptor belt 201; 203, multi-laser-beams; 205, transfer unit A; 206, a toner image transfer drum (referred to as a transfer drum); 207, a transfer belt A; 208a and 208b, drive rolls for driving the transfer belt A; 209, a precharger; 210, a print paper; 211, a registering roller pair; 212, a fixing unit; 213, an eraser lamp; 217, an optical system; 218, a rotary mirror; 219, a reflecting mirror; 241, a black developing unit; 242, a cyan developing unit; 243, a magenta developing unit; 244, a yellow developing unit; 1141, a cleaner A; 1142, a cleaner B; and 1143, a cleaner C.

The photo receptor belt 201, made of conductive material, is driven to turn at a desired speed by a pair of drive rolls 201a and 201b, which are driven by a drive mechanism (not shown). The photo receptor belt 201 is surrounded by the charger 202, multi-laser-beams 203, black developing unit 241, cyan developing unit 242, magenta developing unit 243, yellow developing unit 244, transfer drum 206, eraser lamp 213, cleaner A 1141, and the like, which are arranged in this order in the advancing direction of the belt.

The transfer drum 206 is driven to turn at a desired speed by a drive mechanism (not shown) in a state that its outer surface is in contact with the photo receptor belt 201.

The transfer belt A 208 is driven to turn at a controlled speed by a pair of drive rolls 208a and 208b. The surface of the belt A where it is contact with the transfer drum 206 advances in the same direction as the rotating direction of the drum.

The drive mechanisms (not illustrated) for the drive rolls 201a and 201b, for the transfer drum 206, and the drive rolls 208a and 208b are coupled with a drive motor and a reduction mechanism (both not shown). The reduction mechanism is selectively operated to allow the drive mechanisms to operate independently at controlled rotating speeds.

The optical system 217 includes the rotary mirror 218 and the reflecting mirror 219. The rotary mirror 218 is rotated at high speed to deflect the scan beam and the reflecting mirror 219 reflects the scan beam, thereby forming high speed scan multi-laser-beams 203 of four beams.

Inside of the loop of the photo receptor belt 201, the transfer unit A 205 is provided at a location where the belt comes in contact with the transfer drum 206.

At a location on the surface of the transfer drum 206, which is opposed to the location where the transfer drum 206 is in contact with the photo receptor belt 201, the transfer drum 206 and the transfer unit B 207 forms a nip therebetween. The print paper 210 passes through the nip.

The transfer belt A 208 is located at near to a mid location of a path along which the surface of the transfer drum 206 leaving the transfer belt A 208 advances and reaches the photo receptor belt 201.

The registering roller pair 211 is located downstream of the transfer belt A 208, and the fixing unit 212 is located upstream of the same. The registering roller pair 211 and the fixing unit 212, which are located on both sides of the transfer belt A 208, function to strain the print paper 210 being nipped by the transfer drum 206 and the transfer belt.

Within the loop of the transfer belt A 208 the transfer unit B 207 is located at a location where it comes in contact with the transfer drum 206. The precharger 209 and the cleaner C 1143 are disposed around the loop of the transfer belt A 208.

The operation of the high speed color printer thus constructed will be described.

The printing operation of the printer, which begins with the charging and ends with the transfer, is carried out every page.

The photo receptor belt 201 is uniformly charged by the charger 202, and is exposed to the multi-laser-beams 203, so that a latent electrostatic image is formed thereon. The four laser beams as the multi-laser-beams 203 scan the surface of the moving photo receptor belt 201 at a speed four times as large as the moving speed of the photo receptor belt 201 during the development process.

Through the charge/exposure process, which progresses at the four-times speed, latent electrostatic images c, m, and y corresponding to the print information of cyan, magenta and yellow are formed on the photo receptor belt 201, with three number of high speed scan beams. During the charge/exposure process, the black, cyan, magenta and yellow developing units 241, 242, 243, and 244 are retracted from the belt, and in an inoperative state.

Then, the reduction mechanism reduces the speed of the photo receptor belt 201 to ¼, and from a location A, viz., a mid location between the charger 202 and the black developing unit 241, only one of the four scan beams 203 is used to form a latent electrostatic image corresponding to black print information.

Concurrently with the formation of the latent electrostatic image of black, the black, cyan, magenta and yellow developing units 241, 242, 243, and 244, which are moved toward the belt, develop the latent electrostatic image of the respective colors. During the developing process, the photo receptor belt 201 is moved at the ¼ speed of that during the charge/exposure process.

It is noted here that since the development progresses at the slow speed, a color image of high picture quality can be formed.

The developed toner images of the respective colors are successively transferred on the transfer drum 206 by the transfer unit A 205. After the transferred toner images are registered on the transfer belt A 208, the toner images are transferred by the transfer unit B 207, thereby forming a full color toner image of a first page.

After the color toner images are all transferred from the transfer drum 206 to the transfer belt A 208, toner and charge are still left on the transfer drum 206. The cleaner B 1142 removes the residual toner and charge.

After the full color image of the first page is formed, the transfer belt A 208 moves upward and detaches from the transfer drum 206, and is ready for the next image forming operation.

After completion of the first development, the cleaner A 1141 operates to remove the toner left on the photo receptor belt 201. At this point, latent electrostatic images for a color image of the next page may be formed on the photo receptor belt 201.

The photo receptor belt 201 is moved at the four-times speed. Through the procedural steps similar to those mentioned above, toner images of the four colors are formed, registered and transferred on the transfer drum 206.

In this way, the full color toner image of the first page (obverse side) is formed on the transfer belt A 208, and the full color toner image of the second page (reverse side) is formed on the transfer drum 20.

The transfer belt A 208 moves toward the transfer drum 206 to nip the print paper 210 therebetween. The precharger 209 reverses the charge polarity of the full color image on the first page (obverse side) on the transfer belt A 208. If the charge of the full color image is positive, it is reversed to the negative charge.

The registering roller pair 211 registers the print paper 210 so that the toner images will be formed thereon at correct locations.

The print paper 210, after registered, advances from right to left through the nip between the polarity-adjusted transfer belt A 208 and the transfer drum 206. With the advancement of the belt, the full color toner images of the first page (obverse side) and the second page (reverse side) are progressively transferred on both sides of the print paper 10 as a print media.

The full color toner images, after transferred on the obverse and the reverse sides of the print paper 210, are fixed thereon simultaneously. The fixing speed is equal to the developing speed.

After the toner image transfer, the eraser lamp 213, cleaner A 1141, cleaner B 1142, and cleaner C 1143 are operated to remove toner and charge left on the photo receptor belt 201, transfer drum 206, and transfer belt A 208.

Each transfer speed may be equal to the charge/exposure process or the developing speed. This can readily be gained if the synchronous mode is selected in connection with the moving speed of the photo receptor belt 201.

The transfer speed may be equal to the charge/exposure process if the relative positions and timings of the charge, exposure, development and transfer processes are properly selected.

(Embodiment 11)

Still another embodiment of the invention will be described with reference to FIG. 13.

This embodiment also relates to a high speed, duplex print, color laser printer based on the Xerographic printing process.

As shown in FIG. 13, the printer used in Embodiment 10 uses four beams as the multi-laser-beams 203. The instance embodiment uses a single laser beam. The rotating speed of the rotary mirror 218 is four times as large as that of the embodiment using the four laser beams. The horizontal scan density is selected corresponding the moving speed of the photo receptor belt 201, which is four times as large as that of the embodiment using four laser beams. The exposure is carried out at this horizontal scan density to form a latent electrostatic image.

The latent electrostatic image formed has the same recording density by carrying out the modulation every four scan lines.

(Embodiment 12)

Still another embodiment of the invention will be described.

This embodiment also relates to a high speed, duplex print, color laser printer based on the Xerographic printing process.

As shown in FIG. 13, in Embodiment 10, the full color image is formed using three primary colors, magenta, cyan and yellow, and the charge/exposure process is performed for the black toner image formation. In the instant embodiment, latent electrostatic images corresponding to the print information of magenta, cyan, and yellow are formed at the portions of y, m, and c, respectively. Then, the moving speed of the photo receptor belt 201 is reduced to ¼, and the respective color toner images are developed.

In the image forming process of the instant embodiment, the charge and exposure processes for the black image may be omitted.

(Embodiment 13)

Yet another embodiment of the invention will be described.

This embodiment also relates to a high speed, duplex print, color laser printer based on the Xerographic printing process.

As shown in FIG. 13, in the instant embodiment, the magenta developing unit 243 and the yellow developing unit 244 are removed from the construction of Embodiment 1. The developing units of colors arbitrarily selected are used instead of the black developing unit 241 and the cyan developing unit 242. A single beam or dual beams are used for the exposure process.

The moving speed of the photo receptor belt during the charge/exposure process for forming the latent electrostatic image is set to be twice as large as that of the belt during the developing process.

(Embodiment 14)

A still further embodiment of the invention will be described.

This embodiment also relates to a high speed, duplex print, color laser printer using four primary colors, which is based on the Xerographic printing process.

Figure 14:
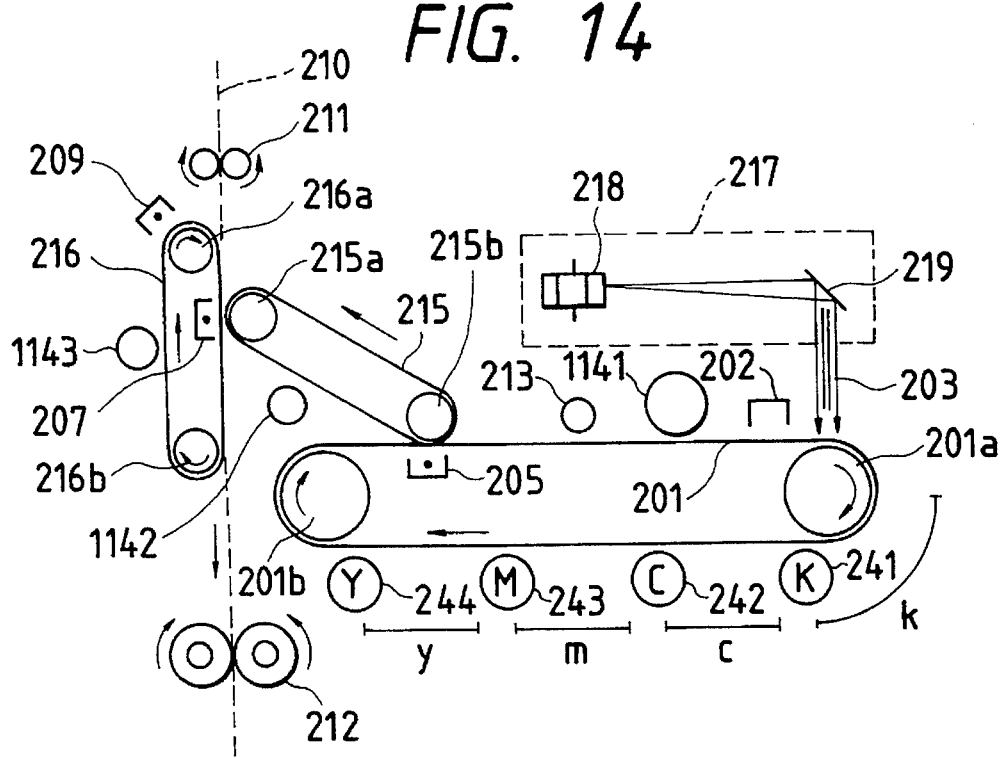
FIG. 14 is a view showing a color printer according to a yet still further embodiment of the invention.

FIG. 14 is a view showing a color printer according to still another embodiment of the invention.

In FIG. 14, like or equivalent portions are designated by like reference numerals in FIG. 13, for simplicity. As regards the portions not found in the construction of FIG. 13, reference numeral 215 designates a transfer belt B; 215a and 215b, drive rolls for driving the belt B 215; 216, a transfer belt C; and 216a and 216b, drive rolls for driving the belt C.

The construction of the color printer shown in FIG. 214 is substantially equal to that of Embodiment 10 except some portions. Description of the instant embodiment will be given placing emphasis on the different portions.

The transfer belt B 215 and the transfer belt C 216 are used instead of the transfer drum 206 in Embodiment 10.

Those belts are driven by the drive roll pairs 215a and 215b, and 216a and 216b.

A loop of the transfer belt B 215, disposed obliquely with respect to the photo receptor belt 201, contacts at one end with the photo receptor belt 201, while it contacts at the other end with the transfer belt C 216. The location of the transfer belt B 215 where it contacts with the photo receptor belt 201 corresponds to the location of the transfer unit A 205, which is disposed within the loop of the photo receptor belt 201.

Within the loop of the transfer belt C 216, the transfer unit B 207 faces the location where the transfer belt C 216 contacts with the transfer belt B 215. The registering roller pair 211 is located upstream of the transfer belt C 216, and the fixing unit 212 is located downstream thereof.

The print paper 210 passes through the nip between the transfer belt C 216 and the transfer belt B 215.

The multi-laser-beams 203, modulated by the color print information, scan the surface of the photo receptor belt 201, thereby forming latent electrostatic images thereon.

The moving speed of the photo receptor belt 201 during the charge/exposure process is four times as large as that of the photo receptor belt 201 during the development process as in Embodiment 10. The latent electrostatic image areas for the respective colors y (yellow), m (magenta), c (cyan) and k (black) are formed on the photo receptor belt 1 moving at this speed.

The black, cyan, magenta and yellow developing units 241, 242, 243, and 244 are operated and the moving speed of the photo receptor belt 201 is reduced to ¼, so that the latent electrostatic images thus formed are developed to form high quality toner images of those colors.

Those developing units are retracted from the photo receptor belt and rendered inoperative.

The moving speed of the photo receptor belt 201 is returned to the original speed, viz., the speed four times as large as that during the developing process. The color toner images formed are transferred onto the transfer belt B 215 by the transfer unit A 205.

At the instant that the moving speed is returned to the original speed, the charge/exposure process is carried out by the charger 202 and the multi-laser-beams 203, thereby forming latent electrostatic images for the respective color print information of the next page.

The process to transfer the full color toner images on both sides of the print paper 210 is carried out by the transfer belt B 215 and the transfer belt C 216 as in the previous manner. In this embodiment, the transfer belts B and C serve as the transfer drum 206 and the transfer belt A 208 in Embodiment 10, respectively. Therefore, no further description on this transfer process will be given here.

(Embodiment 15)

An additional embodiment of the first invention will be described.

This embodiment also relates to a high speed, duplex print, color laser printer using four primary colors, which is based on the Xerographic printing process.

Description of this embodiment handles the image formation of a large size, full color image by using the high speed color printer of FIG. 14.

It is assumed not that the latent electrostatic image areas for the respective colors y (yellow), m (magenta), c (cyan) and k (black), which are formed on the photo receptor belt 201, have each the size of 42 cm, which is the lateral size of A4 size print paper 202. The color image is printed on a print paper larger than this size, for example, 42 cm of the vertical size of the print paper of A3, in the following manner.

Through the charge/exposure process, the latent electrostatic images for y (yellow) and c (cyan) are formed at the four-times speed. Then, the latent electrostatic images formed are developed by the cyan developing unit 242 and the yellow developing unit 244 at the ¼ speed of that during the charge/exposure process.

The toner images of the y (yellow) and c (cyan) are transferred on the transfer belt B 215 at the four-times speed, while at the same time the latent electrostatic images for the k (black) and m (magenta) are formed. The latent electrostatic images formed are developed by the black developing unit 241 and the magenta developing unit 243, and the formed toner images are transferred on the transfer belt B 215.

In this way, the color image can be printed on the print paper of A3 size, twice as large as A4 size.

The distance from the black developing unit 241 to the exposure point is preferably at least 42 cm, the vertical length of A3 size. Also in a case where the distance is within the range between 42 cm and 21 cm, the latent electrostatic image formation is possible in a manner that when the moving speed of the photo receptor belt 201 is changed, the multi-laser-beams 203 is switched from four beams to one beam.

In the constructions of Embodiment 10 to Embodiment 15, if the developing speed is set to that for the monocolor in the full color print using four principle colors, the speed of the remaining processes is four times that for the monocolor. Accordingly, the time for the full color print is increased by only 25% when compared with the monocolor print.

To realize a high speed full color printer using the prior art, it is necessary to increase the printing speed four times or to use four monocolor printers. This leads to the deterioration of image quality, complexity and expense of the printer.

The instant embodiment is free from the image quality deterioration, simplifies the machine construction, and needs little increase of cost to manufacture. And a full color image can be printed by one printer.

The same construction may be used for the respective developing units.

(Embodiment 16)

Another embodiment of the invention will be described.

Figure 15:
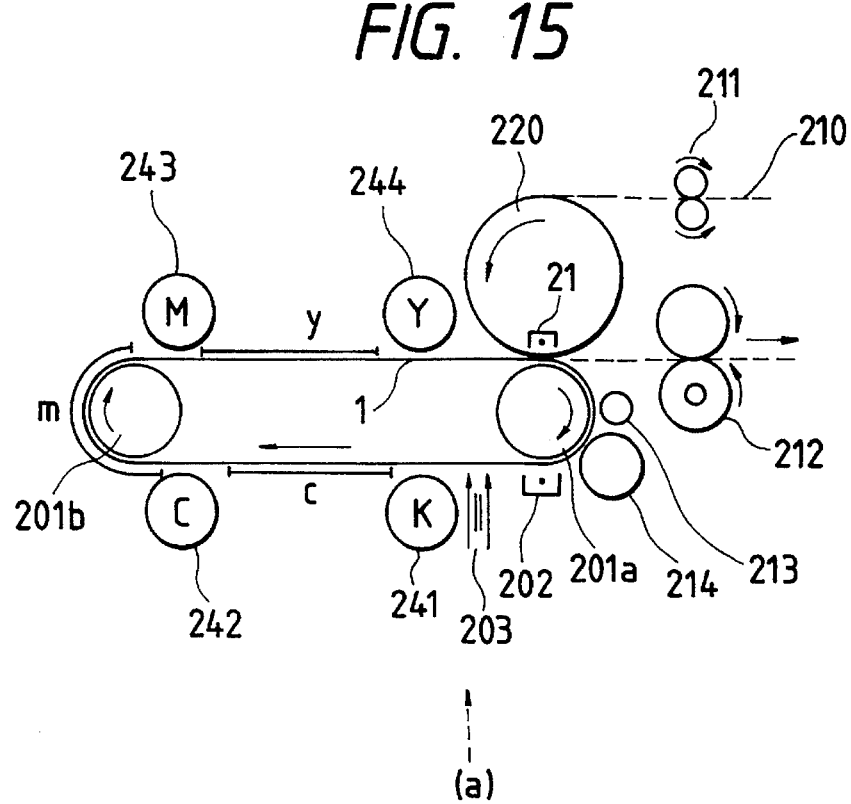
FIG. 15 is a view showing a color printer according to a yet still further embodiment of the invention.

FIG. 15 is a view showing a color printer according to still another embodiment of the invention.

This embodiment also relates to a high speed, duplex print, color laser printer using four primary colors, which is based on the Xerographic printing process. In the printer, the transfer mechanism for transferring the toner images on the print paper is simplified.

The construction of the printer of this embodiment is substantially the same as that of Embodiment 10 or Embodiment 14 except that the transfer belt A 208, the transfer belt B 215 and the transfer belt C 16 are removed, and the print paper 210 is wound around the transfer drum.

A pair of developing units is disposed above the photo receptor belt 201, while another pair of developing units, below the same, as shown.

In FIG. 15, like or equivalent portions are designated by like reference numerals in FIG. 13, for simplicity. As regards the portions not found in the construction of FIG. 13, reference numeral 220 designates a roll/transfer drum 220 around which the print paper is wound; and 221, a transfer unit C 221 disposed within the loop of the roll/transfer drum.

In the color printer shown in FIG. 15, a pair of developing units, the magenta developing unit 243 and the yellow developing unit 244, is closely disposed above the photo receptor belt 201. Another pair of developing units, the black developing unit 241 and the cyan developing unit 242, are closely disposed under the photo receptor belt 201. The roll/transfer drum 220 is brought into contact with the photo receptor belt 201. Within the loop of the roll/transfer drum 220, the transfer unit C 221 is disposed above the contact point of them.

The print paper 210, wound round the roll/transfer drum 220, advances through the registering roller pair 211 and along the surface of the roll/transfer drum, and leaves the fixing unit 212.

The charge, exposure, and development processes in the instant color printer is substantially the same as those in Embodiment 10. The color toner images developed on the photo receptor belt 201 are transferred on the print paper 210 by the transfer unit C 221.

Thus, in this printer, the transfer mechanism for transferring the color image on the print paper and the transport mechanism for the print paper are simplified. Therefore, a high speed color printer of small size is realized.

(Embodiment 17)

Yet another embodiment of the invention will be described.

Figure 16:
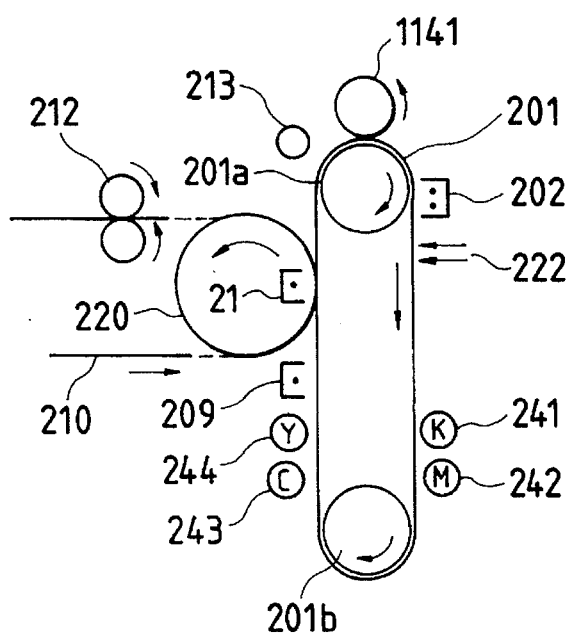
FIG. 16 is a view showing a color printer according to a yet still further embodiment of the invention.

FIG. 16 is a view showing a color printer according to yet another embodiment of the invention.

This embodiment also relates to a high speed, duplex print, color laser printer using four primary colors, which is based on the Xerographic printing process. In the printer, the exposure and development processes are simplified.

In FIG. 16, like or equivalent portions are designated by like reference numerals in FIGS. 13 and 15, for simplicity. As regards the portions not found in the construction of FIG. 13, reference numeral 222 designates dual laser beams.

The construction of the printer of this embodiment is substantially the same as that of Embodiment 10 or Embodiment 16 except that using the dual laser beams 222, latent electrostatic images for two colors are formed on one latent electrostatic image area, and are developed with toner of two colors.

The operation of the instant embodiment will be described.

The photo receptor belt 201 is uniformly charged by the charger 202, and is scanned for exposure by the dual laser beams 222 at high speed. A latent electrostatic image for the first color is formed on the upper half of the charged surface of the photo receptor belt, and another latent electrostatic image for the second color, on the lower half of the charged surface.

The two latent electrostatic images are developed with toner of different colors and different charge polarities into two color toner images. The moving speed of the photo receptor belt 201 during the charge/exposure process is preferably higher than that during the development process, for example, at least two times as large as the latter.

This will be described more specifically.

The latent electrostatic images for c (cyan) and y (yellow) and the latent electrostatic images for k (black) and m (magenta) are respectively formed in the first and second areas at high speed.

The latent electrostatic images on the two areas are simultaneously developed with the cyan developing unit 242 and the yellow developing unit 244, and the black developing unit 241 and the magenta developing unit 243, thereby forming two sets of color toner images of c (cyan) and y (yellow), and k (black) and m (magenta). In this case, the moving speed of the photo receptor belt 201 is set to the developing speed, as a matter of course.

The charge polarities of the two sets of toner images are arranged by the precharger 209, and are transferred on the print paper 210 wound around the roll/transfer drum 220. The development and transfer processes progress, while at the same time part of the charge and exposure processes for the next page are carried out.

After the completion of the development, the high speed transfer is carried out. At this time, the charge and exposure processes for the remaining part of the next page are carried out at high speed. The dual laser beams 222 may be substituted by any other number of laser beams, for example, one beam or three or more beams, if the high speed scan is allowed.

As described above, in this embodiment, two toner regions are used, and the transfer is carried out only two times. This feature contributes to size reduction, increase of print speed, and reduction of cost.

(Embodiment 18)

A further embodiment of the invention will be described.

Figure 17:
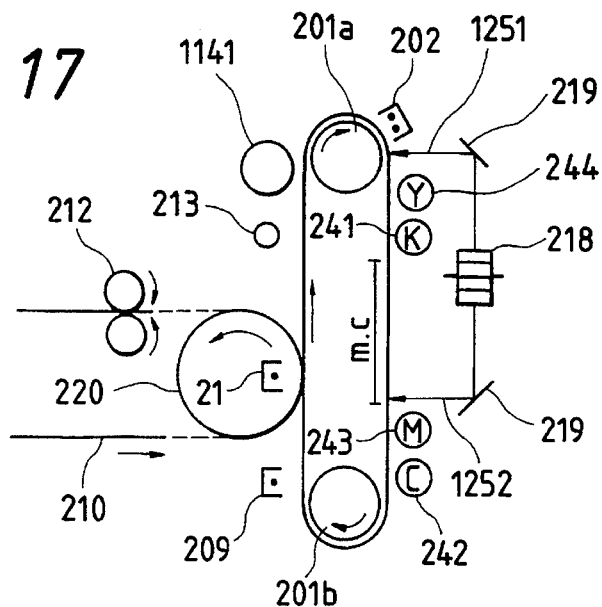
FIG. 17 is a view showing a color printer according to a yet still further embodiment of the invention.
Figure 18:
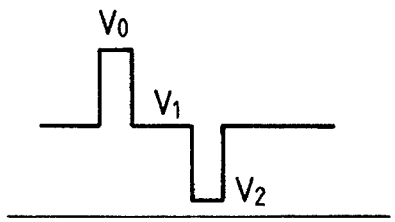
FIG. 18 is a graphical representation of latent electrostatic images formed by the printer.

FIG. 17 is a view showing a color printer according to a further embodiment of the invention. FIG. 18 is a graphical representation of latent electrostatic images formed by the printer.

This embodiment also relates to a high speed, duplex print, color laser printer using four primary colors, which is based on the Xerographic printing process. In the printer, the exposure and development processes are simplified as in Embodiment 17. In FIG. 17, like or equivalent portions are designated by like reference numerals in FIGS. 13, 14 and 15, for simplicity. As regards the portions not found in the previous constructions, reference numeral 1251 and 1252 designate laser beams in FIG. 17. In FIG. 18, $V_0$ represents the surface potential of the photo receptor belt 201 when it is charged. $V_1$ and $V_2$ represent the surface potential, which depends on an intensity of the laser beam.

The construction of the printer of this embodiment is substantially the same as that of Embodiment 10 or Embodiment 17. Only different portions of the embodiment will be described.

In the present embodiment, an optical system including a rotary mirror 218 and reflecting mirrors 219 located on both sides of the mirror splits an incoming laser beam into two laser beams 1251 and 1252.

The photo receptor belt 201 is charged by the charger 202. At this time, the moving speed of the belt 201 is higher than that during the exposure/development process, preferably at least two times as high as the latter. The moving speed of the belt 201 is reduced, and the laser beam 1252 scans the areas for m (magenta) and c (cyan) to form latent electrostatic images thereon. The magenta developing unit 243 and the cyan developing unit 242 develop the latent electrostatic images to form toner images of m (magenta) and c (cyan).

Then, the charger 202 charges the photo receptor belt 201, the laser beam 1251 forms latent electrostatic images for y (yellow) and k (black), and the yellow developing unit 244 and the black developing unit 241 develops those latent electrostatic images into color toner images.

The toner images formed on the two areas are registered and transferred onto the print paper 210 at high speed by the transfer drum 220. The eraser lamp 213 and the cleaner A 1141 remove the residual toner on the photo receptor belt in preparation for the next page print. This sequence of procedural steps is repeated.

In FIG. 18 showing a variation of the surface potential representing latent electrostatic images, the surface of the photo receptor belt 201 is charged up to $V_0$. When it is exposed to the laser beam modulated by print information, two contrast potentials $(V_0-V_1)$ and $(V_1-V_2)$ are formed on the surface of the belt. The latent electrostatic image of $(V_0-V_1)$ is normally developed with toner of the same charge polarity as that of the belt surface. The latent electrostatic image of $(V_1-V_2)$ is reversely developed with toner of the charge polarity opposite to that of the belt surface. As a consequence, toner images of two colors are formed.

The surface potential variation of the latent electrostatic images shown in FIG. 18 is correspondingly applied to the two-color development process in Embodiment 17.

The embodiment eliminates the increase of cost, which results from the increase of print speed, and simplifies the optical system.

(Embodiment 19)

A still further embodiment of the invention will be described.

Figure 19:
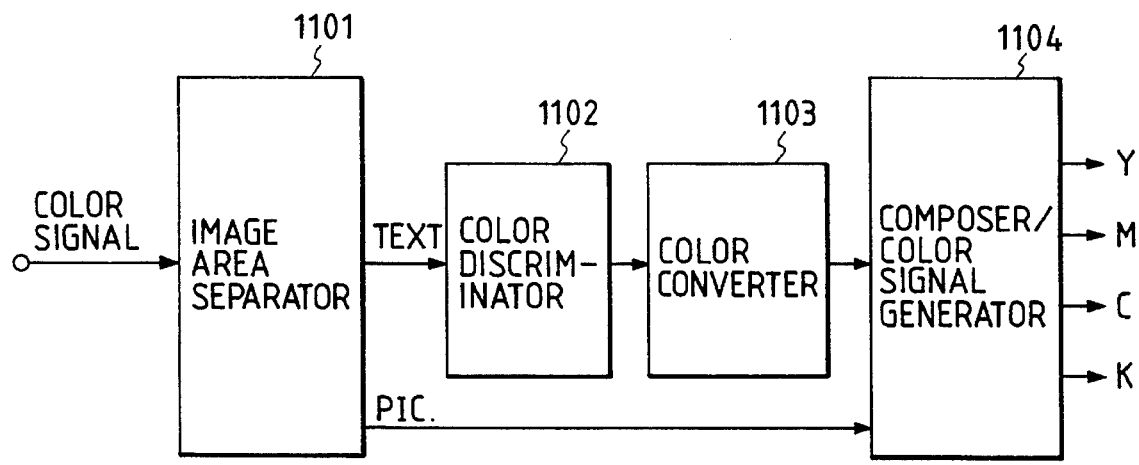
FIG. 19 is a block diagram showing a color printer according to a yet still further embodiment of the invention.

FIG. 19 is a block diagram showing a color printer according to a still further embodiment of the invention.

The constructions of Embodiment 10 to Embodiment 18 of the invention provide a high speed, economical color printer with a small printing speed difference between the monocolor image print and the full color image print.

In the monocolor to full color image formation of two or more colors, the color toner images must be exactly registered with each other.

The range of 0.1 to 0.2 mm suffices for the registration accuracy of the picture image. The range of 0.02 to 0.05 mm, practically 0.07 to 0.1 mm, is required for the registration accuracy of characters and fine lines, particularly small characters of 10 points or less and fine lines of 0.2 mm in width. In the constructions of Embodiment 10 to Embodiment 18, this is more problematic when a belt type photo receptor is used.

FIG. 19 is a block diagram showing an exposure signal generating circuit. In FIG. 19, reference numeral 1101 designates an image area separator; 1102, a color discriminator; 1103, a color converter; and 1104, a composer/color signal generator.

A color signal is input to the image area separator 101 which determines whether the incoming color signal is a character signal, a fine line signal (both called TEXT signals) or a picture signal (called a PIC signal).

When receiving the TEXT signal, the color discriminator 1102 discriminates the color of the signal, more exactly, specifies which of the colors, c (cyan), y (yellow), k (black), m (magenta), R (red), and G (green) is most akin to the color of the received signal, and a gray level of the specified color. The color converter 1103 converts the color into the specified color.

The composer/color signal generator 1104 composes the TEXT signal output from the color converter and the PIC signal from the image area separator 1101 into another color signal.

Latent electrostatic images are formed using the thus formed color signal, and registered and transferred. The resultant image is printed in any of colors, c (cyan), y (yellow), k (black), and m (magenta) or the color not so distinguished visually, R (red) or G (green).

The instant embodiment lowers the registration accuracy to be approximately ½ to ⅓, 0.2 mm, when comparing with the conventional printer. This leads to the cost reduction of the machine.

As seen from the foregoing description, in the present invention, the first toner image is formed on the first recording media, and the first toner image is then transferred on the second recording media. Then, the second toner image is formed on the first recording media, and the first and second toner images are transferred on both sides of the final recording media (print paper). Therefore, one passage of the recording substance through the apparatus completes the duplex print. Thus, the present invention succeeds in providing a toner image forming apparatus capable of reliably printing toner images on both sides of the final recording media at high speed.

As seen from the foregoing description, the toner image forming apparatus of the invention has a function to form images of one or more types on a first recording media and to transfer and fix the images on a final recording media, a function to repeat, one or plural times, the transfer of the images of the first recording media on a second recording media, thereby composing an image, and to transfer and fix the composed image on the reverse side of the final recording media, and a function to select either of the above functions. Therefore, plural types of images of monocolor, multi-color and full color can be formed without excessive decrease of print speed by using one toner image forming apparatus. Thus, the present invention succeeds in providing a toner image forming apparatus which can form plural types of images of monocolor, multi-color and full color without excessive decrease of print speed.

As described above, the present invention successfully provides a high speed color printer which can print a color image at a high speed while not increasing the developing speed, which determines the picture quality of the resultant color image.

Further, the present invention successfully provides a high speed color printer which can form a color image of high picture quality, lowering the required registration accuracy in the formation of a color image.

What is claimed is:

1. A toner image forming apparatus comprising:

a first recording medium;

a second recording medium;

a final recording medium;

first means for forming an image of at least one type on said first recording medium, and then for transferring and fixing the image on said first recording medium onto a front side of said final recording medium;

second means for repeating, one or plural times, the transfer of the images on said first recording medium on said second recording medium, thereby forming a composed image, and then for transfering and fixing the composed image on a reverse side of said final recording medium; and means for selecting at least one of said first and second means.

2. A toner image forming apparatus according to claim 1, wherein the toner images are simultaneously or successively transferred on both sides of said final recording medium in a one-image for one-side manner, and the transferred images are simultaneously fixed on said final recording medium.

3. The toner image forming apparatus according to claim 1, wherein:

said first recording medium comprises a photo receptor for forming a first toner image from a first information source and a second toner image from a second information source thereon, respectively, wherein the first and second toner images are color images having charge polarities opposite to each other, said apparatus further comprising:

a light source for exposure;

means for charging said first recording medium;

means for measuring a surface potential of a non-exposed portion of a surface of said first recording medium and a surface potential of exposed portions of said first recording medium surface; and means for controlling a quantity of charge from said charging means and a quantity of exposure light emitted from said light source such that the surface potential on the surface portion exposed due to said first information source is set near a fixed value existing between the surface potential of the non-exposed surface portion and that of the surface portion exposed due to said second information source.

4. A method of forming a toner image on a recording medium, comprising the steps of:

forming color images of at most two colors by developing latent electrostatic images modulated with two types of signals, by using two types of toner having different colors and different polarities, and transferring the color images on one of an intermediate recording medium and a final recording medium; and superposedly developing color images of at least three colors on a recording media by developing latent electrostatic images modulated with at most two types of signals different from the signals used in the first step, by using two types of toner having different polarities and colors not equal to the colors of the toner used in the first step, and transferring the color signals on one of said intermediate recording medium and said final recording medium in a registered fashion.

5. A toner image forming apparatus, comprising:

a recording medium having an image forming surface which is charged to an initial surface potential;

means for forming a toner image of one or two colors on the surface of said recording medium, in which the initial surface potential for a one-color toner image is approximately ½ as high as the initial surface potential for a two-color toner image.

6. A toner image forming apparatus, comprising:

a first recording medium;

a second recording medium;

means for developing latent electrostatic images on said first recording medium with two types of developers having different charge polarities; and means for transferring developed toner images to said second recording medium, wherein when the images are recorded in a monocolor mode, the polarity of a charger is reversed to the charge polarity of the toner.

7. A method of forming a toner image, comprising the steps of:

forming color images of at most two colors on a recording medium by developing latent electrostatic images modulated with two types of signals, by using two types of toner having different colors and different polarities; and superposedly developing color images of at least three colors on a recording medium by developing latent electrostatic images modulated with at most two types of signals different from the signals used in the first step, by using two types of toner having different polarities and colors not equal to the colors of the toner used in the first step; and transferring the color images onto another recording medium in a registered fashion.

8. A toner image forming apparatus for forming an image on at least one surface of a sheet, comprising:

a first endless intermediate transfer medium which is movably supported;

a second endless intermediate transfer medium which is movably supported and positioned to form a nip portion with said first intermediate transfer medium such that said first and second intermediate transfer media contact a first and second side of said sheet when said sheet passes said nip portion;

an endless photosensitive body which is movably supported and contacts said first intermediate transfer medium at a position nearly opposite to said second intermediate transfer medium such that said photosensitive body does not contact said sheet;

means for transferring an image formed on said photosensitive body to said first intermediate transfer medium; and means for transferring the image held on said first intermediate transfer medium to said second intermediate transfer medium.

9. A method of forming a toner image on a recording medium, comprising the steps of:

forming color images of at most two colors by developing latent electrostatic images modulated with two types of signals corresponding to first and second information sources, by using two types of toner having different colors and different polarities, and transferring the color images on one of an intermediate recording medium and a final recording medium; and superposedly developing color images of at least three colors on a recording medium by developing latent electrostatic images modulated with at most two types of signals different from the signals used in the first step, by using two types of toner having different polarities and colors not equal to the colors of the toner used in the first step and transferring the color signals on one of said intermediate recording medium and said final recording medium in a registered fashion;

wherein said latent electrostatic images are formed by electrically charging said recording medium and exposing said recording medium to exposure light such that the surface potential on a surface portion of said recording medium exposed due to said first information source is set near a fixed value existing between the surface potential of the non-exposed surface portion and that of a surface portion of said recording medium exposed due to said second information source.

* * * * *